US012768639B2

(12) United States Patent
Muir et al.

(10) Patent No.: US 12,768,639 B2
(45) Date of Patent: Oct. 20, 2026

(54) THREE-PHASE SPECTRAL INTERFEROMETRY WITH IMPROVED SIGNAL RETRIEVAL

(71) Applicant: Lawrence Livermore National Security, LLC, Livermore, CA (US)

(72) Inventors: Ryan Douglas Muir, Livermore, CA (US); John E. Heebner, San Ramon, CA (US); Daniel Ernest Mittelberger, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 235 days.

(21) Appl. No.: 18/525,578

(22) Filed: Nov. 30, 2023

(65) Prior Publication Data

US 2024/0159511 A1 May 16, 2024

Related U.S. Application Data

(63) Continuation-in-part of application No. 18/047,120, filed on Oct. 17, 2022, now Pat. No. 12,359,972.

(51) Int. Cl.

| | |
|---|---|
| ***G01B 9/02*** | (2022.01) |
| ***G01J 3/45*** | (2006.01) |
| ***G11B 7/0065*** | (2006.01) |

(52) U.S. Cl.

CPC ............ *G01B 9/02041* (2013.01); *G01J 3/45* (2013.01); *G11B 7/0065* (2013.01)

(58) Field of Classification Search

CPC ....... G01B 9/02041; G01J 3/45; G11B 7/0065

See application file for complete search history.

(56) References Cited

U.S. PATENT DOCUMENTS

| | | | |
|---|---|---|---|
| 5,671,047 | A | 9/1997 | Curbelo |
| 6,943,881 | B2 | 9/2005 | Wang |

(Continued)

FOREIGN PATENT DOCUMENTS

| | | | |
|---|---|---|---|
| CN | 107110640 | A | 8/2017 |
| CN | 210323604 | U | 4/2020 |

(Continued)

OTHER PUBLICATIONS

International Search Report & Written Opinion mailed Nov. 30, 2023 for International Patent Application No. PCT/US2023/072577 (11 pages).

(Continued)

*Primary Examiner* — Tarifur R Chowdhury
*Assistant Examiner* — Joshua M Carlson
(74) *Attorney, Agent, or Firm* — Workman Nydegger

(57) ABSTRACT

Methods, systems and devices are described that enable measurement and characterization of complex laser pulses by relying on three interferograms that are measured simultaneously. The described three-phase spectral interferometry (3PSI) can meet the growing demand for optical recorders with long record and 1 ps or finer resolution. These techniques leverage various calibration and signal retrieval operations that allow improved system performance. An example method for determining characteristics of an input optical signal includes measuring the spectra associated with three interferograms produced at outputs of a three-by-three optical splitter, and determining an amplitude and a phase value of the input optical signal using those measurements and the results of a calibration procedure that characterizes point spread functions across multiple spectrometers and determines corrections factors for the spectrometers.

20 Claims, 7 Drawing Sheets

(56) References Cited

U.S. PATENT DOCUMENTS

| | | | | |
|---|---|---|---|---|
| 9,612,105 | B2 | 4/2017 | Kemp | |
| 10,012,535 | B2 | 7/2018 | Huang et al. | |
| 10,663,346 | B2 * | 5/2020 | Hegyi | G01J 3/28 |
| 2003/0185577 | A1 | 10/2003 | Yamada | |
| 2004/0246490 | A1 | 12/2004 | Wang | |
| 2004/0246491 | A1 * | 12/2004 | Gurunathan | G01J 9/04 356/484 |
| 2006/0012797 | A1 | 1/2006 | Chang et al. | |
| 2006/0033927 | A1 | 2/2006 | Froggatt et al. | |
| 2006/0146340 | A1 | 7/2006 | Szwaykowski et al. | |
| 2007/0055466 | A1 | 3/2007 | Ozcan et al. | |
| 2008/0002209 | A1 | 1/2008 | Yaqoob et al. | |
| 2008/0087078 | A1 | 4/2008 | Vannuffelen et al. | |
| 2011/0188854 | A1 | 8/2011 | Honda | |
| 2015/0192467 | A1 | 7/2015 | Sharma et al. | |
| 2016/0054112 | A1 | 2/2016 | Hess | |
| 2016/0282184 | A1 * | 9/2016 | Khalil | G01J 3/108 |
| 2017/0153142 | A1 | 6/2017 | Rosen et al. | |
| 2018/0045694 | A1 * | 2/2018 | Wyatt | G01N 30/74 |
| 2020/0264417 | A1 * | 8/2020 | Agrawal | G02B 21/0072 |
| 2021/0088327 | A1 * | 3/2021 | Tao | G01M 11/025 |
| 2021/0218215 | A1 | 7/2021 | Misawa et al. | |
| 2022/0283540 | A1 | 9/2022 | Trepanier et al. | |
| 2023/0100317 | A1 | 3/2023 | Pelc et al. | |
| 2023/0411932 | A1 | 12/2023 | Markov et al. | |
| 2024/0133743 | A1 | 4/2024 | Muir | |

FOREIGN PATENT DOCUMENTS

| | | | |
|---|---|---|---|
| EP | 3690418 | A1 | 8/2020 |
| GB | 2622252 | A | 3/2024 |
| JP | 2014072877 | A * | 4/2014 |
| WO | 9722942 | A1 | 6/1997 |
| WO | 2010136810 | A2 | 12/2010 |

OTHER PUBLICATIONS

Gaigalas , et al., "Procedures for Wavelength Calibration and Spectral Responses Correction of CCD Array Spectrometers", Journal of Research of the National Institute of Standards and Technology, vol. 114, No. 4, Jul.-Aug. 2009.

Van Dalen , et al., "Retrieving surface waves from ambient seismic noise using seismic interferometry by multidimensional deconvolution", 20014, Journal of Geophysical Research: Solid Earth, pp. 944-961. (Year: 2014).

Spatio-Temporal Distortions and How We Measure Them, Swamp Optics, Accessed via:https://www.swampoptics.com/spatio-temporal-distortions.html.

Bowlan, Pamela, et al., "Complete single-shot measurement of arbitrary nanosecond laser pulses in time," Jan. 17, 2011 / vol. 19, No. 2 / Optics Express.

Dorrer, Christophe, et al., "High-dynamic-range single-shot cross-correlator based on an optical pulse replicator," Optics Express vol. 16, Issue 18, pp. 13534-13544 (2008).

Dorrer, Christophe, et al., "Spectral resolution and sampling issues in Fourier-transform spectral interferometry," vol. 17, No. 10/Oct. 2000/ J. Opt. Soc. Am. B.

Iaconis, Chris, et al., "Self-Referencing Spectral Interferometry for Measuring Ultrashort Optical Pulses," IEEE Journal of Quantum Electronics vol. 35, No. 4, 1999.

Laser Focus World, "MIIPS characterizes and corrects femtosecond pulses," Accessed via: http://www.laserfocusworld.com/articles/print/volume-43/issue-5/optoelectronics-world/ultrafst- optical-systems/miips-characterizes-and-corrects-femtosecond-pulses.html.

Lepetit, L., et al., "Linear techniques of phase measurement by femtosecond spectral interferometry for applications in spectroscopy," J. Opt. Soc. Am. B/vol. 12, No. 12/Dec. 1995.

M. Shirasaki, "Virtually imaged phased array," Fujitsu Sci. Tech. J. 35, pp. 113-125 (1999).

Oksenhendler, T., et al., "Self-referenced spectral interferometry," Appl Phys B (2010) 99: 7-12, 2010.

Palaniyappan, Sasi, et al., "Single-Shot 60 dB Dynamic Range Laser Contrast Measurement Using Self-Referencing Spectral Interferometry," p. 24, Plasma physics, Los Alamos National Laboratory, Los Alamos, NM. 87545, USA.

Raghuramaiah, M., et al., "Simultaneous measurement of pulse-front tilt and pulse duration of a femtosecond laser beam," Optics Communications vol. 223, Issues 103, pp. 163-168, Jul. 2003.

Supradeepa, V.R., et al., "Optical arbitrary waveform characterization via dual-quadrature spectral interferometry," Optics Express vol. 17, No. 1, 2009.

Trebino, R., Ultrafast Optics Group, "Spectral Interferometry (SI)," Accessed via: http://frog.gatech.edu/spectral-interferometry.html.

Tsz Chun Wong and Rick Trebino, "Single-frame measurement of complex laser pulses tens of picoseconds long using pulse-front tilt in cross-correlation frequency-resolved optical gating," J. Opt. Soc. Am. B 30, 2781-2786 (2013)

Wikipedia, "Frequency-resolved optical gating," Accessed via: http://en.wikipedia.org/wiki/Frequency-resolved_optical_gating.

Wikipedia, "Spectral phase interferometry for direct electric-field reconstruction," Accessed via: http://en.wikipedia.org/wiki/Spatially_Encoded_Arrangement_for_SPIDER.

Wikipedia, "Spectral phase interferometry for direct electric-field reconstruction," Accessed via: http://en.wikipedia.org/wiki/Spectral_phase_interferometry_for_direct_electric-field_reconstruction.

Mittelberger, et al., "Dynamic wavelength control of laser pulse profiles at picosecond to nanosecond timescales", Optics Express vol. 30, Issue 2, pp. 1875-1884 (2022); https://doi.org/10.1364/OE.447494.

Wentworth, Roberth. , "Optical Noise in Interferometric Systems Containing Strongly Unbalanced Paths", Stanford University—R. Wentworth Dissertation, Dec. 1988, pp. 1-24.

Dandridge, A., et al., "Performance of 3x3 Couplers in Fiber Optic Sensor Systems," Proceedings of SPIE—The International Society for Optical Engineering . Sep. 1994, pp. 549-552.

Gottwald, E., et al., "Measurement Method for Determination of Optical Phase Shifts In 3 x 3 Fibre Couplers," Electronics Letters, 1988, vol. 24, No. 5.

Jiang, Yi, et al., "Direct measurement of optical phase difference in a 3 x 3 fiber coupler," Optical Fiber Technology 16 (2010) 135-139.

Pietzsch, Joachim, "Scattering Matrix Analysis of 3 x 3 Fiber Couplers," Journal of Lightwave Technology, vol. 7, No. 2, 1989, pp. 303-307.

* cited by examiner

THREE-PHASE SPECTRAL INTERFEROMETRY WITH IMPROVED SIGNAL RETRIEVAL

CROSS-REFERENCE TO RELATED APPLICATIONS

This patent document is a continuation-in-part of the U.S. application Ser. No. 18/047,120, filed Oct. 17, 2022, titled "Three-phase Spectral Interferometry." The entire contents of the before-mentioned patent application are incorporated by reference as part of the disclosure of this patent document.

STATEMENT REGARDING FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

The disclosed technology generally relates to interferometric techniques and more specifically to phase shift interferometric methods, devices and systems.

BACKGROUND

There is a growing demand for detection of optical signals (e.g., optical recorders) with long recorded duration and 1 ps or finer resolution. Many optical recorders in the literature based on optical techniques have achieved less than 1 ps resolution, but the limited record lengths and low fidelity of these solutions severely limits their utility. Electronically based optical recorders (streak cameras and oscilloscopes) continue to push finer resolutions, though the fidelity of these solutions at ~1 ps resolution is projected to be extremely low. No existing technology can achieve ~1 ns record length while maintaining good fidelity at 1 ps or finer resolution.

Due to the recent advent of hyperfine (less than 2 pm resolution) spectrometers, it may be possible to extend the record length of high resolution optical techniques. In particular, spectral interferometry (SI) is a highly sensitive linear technique with less than 1 ps temporal resolution and a record length that linearly scales with the spectrometer's spectral resolution. Generally, SI measures two or more spectra of the field interferogram of the signal with a reference pulse at two or more known relative phase shifts. From the measured spectra, the temporal signal and phase (full complex electric field) can be retrieved via a Fourier transform.

A wide array of SI techniques using one or two spectrometers have been developed and demonstrated thus far. These techniques, however, have several shortcomings that include: 1) none of these techniques achieve high fidelity or dynamic range, 2) many of these techniques are incompatible with single shot measurements, 3) few techniques are compatible with a reference phase shift that is not exactly 90 degrees, 4) none of these techniques precisely calibrate the reference phase shift, 5) none of these techniques precisely compensate for background due to signal and reference polarization mismatch or phase jitter, 6) none of these techniques compensate for unique point spread functions per wavelength and spectrometer, and 7) many of these techniques suffer distortions due to poorly developed signal processing or approximate solutions. For all of these limitations, the known recourse for improved software and/or hardware techniques is limited. It is therefore highly desirable to develop a high performance and robust spectral interferometry technique that mitigates these problems.

SUMMARY

The disclosed embodiments address the above noted issues of the existing system and include, among other features and benefits, an improved spectral interferometry technique for the characterization of complex laser pulses that relies on three interferograms that are measured simultaneously.

One aspect of the disclosed embodiments relates to an interferometric method for determining characteristics of an input optical signal using a three-phase interferometric system that includes providing the input optical signal to a first input of a three-by-three optical splitter, providing a reference optical signal to a second input of the three-by-three optical splitter, measuring spectra associated with three interferograms produced at a first, a second and a third output of the three-by-three optical splitter, and determining an amplitude value and a phase value of the input optical signal from information obtained from the measured spectra. In this method, prior to providing the input optical signal and the reference optical signal for determining characteristics of an input optical signal, a calibration procedure is performed to characterize point spread functions across multiple spectrometers used for measuring interferograms output from the three-by-three optical splitter, the calibration operation including, for each interferometer: constructing a regression matrix and determining a correction factor that allow spectra of the input optical signal to be retrieved from a background subtracted image according to a linear fitting model.

DETAILED DESCRIPTION

Figure 1:
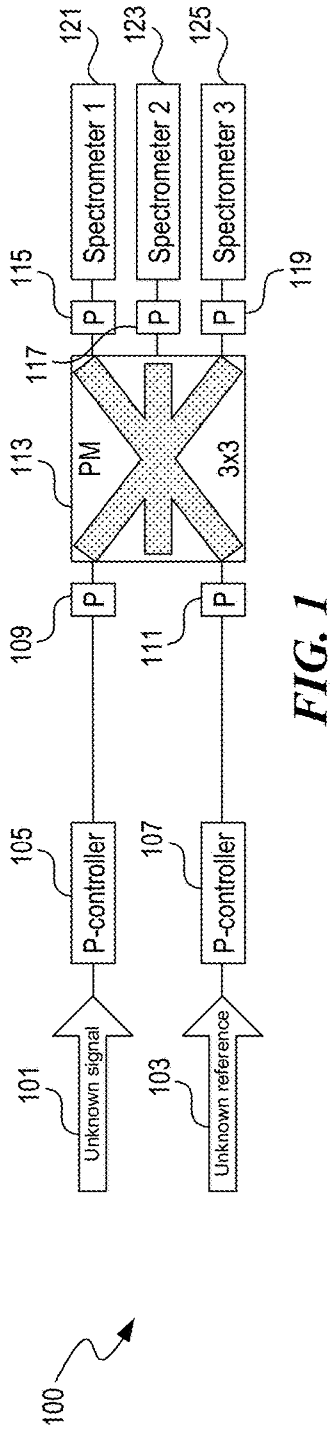
FIG. 1 illustrates a three-phase spectral interferometry system in accordance with an example embodiment.

Techniques for measuring the power and instantaneous wavelength (or, equivalently, the temporal phase) of fast optical pulses (less than 1 ns duration) generally fall into two categories: time domain and spectral domain. Time domain measurements determine the power profile of the unknown laser pulse versus time directly. Examples include high-bandwidth photodiodes, cross-correlators, and streak cameras.

Spectral methods measure the complex spectrum (spectral flux and phase) of the entire pulse. The time profile (power and temporal phase) can then be determined by applying a Fourier transform to the measured complex spectrum. Because the measurement is the Fourier transform of the time profile, the maximum pulse duration is related to the spectral resolution and the finest resolvable temporal feature size is related to the bandwidth of the spectrometer. Spectral methods are generally limited to measuring pulses with a duration of less than 100 ps because of the limited spectral resolution of available spectrometers. Examples of existing spectral methods include SPIDER, MIIPS and FROG. While a version of the latter, ns-FROG, is capable of measuring pulses up to a few ns, ns-FROG is limited to coarse resolution measurements (less than 50 resolvable temporal features).

Spectral interferometry is a specific method that allows retrieval of the temporal amplitude and phase of an unknown laser pulse. In spectral interferometry, the unknown laser pulse (signal) is interfered with a well-characterized reference laser pulse and the resulting spectrum is measured. Together with the signal and reference spectra, this spectral interference pattern gives the cosine of the relative phase ($\phi$) between the signal and reference. However, the phase cannot be determined from its cosine value without ambiguity. This ambiguity can be removed by taking multiple measurements, each with a known phase shift ($\psi$) between the signal and reference. Typically, two measurements are made simultaneously with a $\psi$ of 0 and 90 degrees by means of a 90-degree optical hybrid and two spectrometers. In this way, both the sine and cosine of $\phi$ are measured and the $\phi$ is unambiguously determined. Combining this information with the measured signal spectrum results in the complete spectral amplitude and phase description of the signal pulse in the spectral domain, and Fourier transforming this results in the temporal amplitude and phase of the signal pulse. The practical application of the existing spectral interferometry techniques to laser characterization has been limited because it requires a stable well-characterized reference pulse, its record is limited by the spectral resolvability of available spectrometers, and it suffers from practical stability issues.

The disclosed embodiments, among other features and benefits, include a new implementation of the spectral interferometry method for the characterization of complex laser pulses. The disclosed embodiments rely on three interferograms—rather than two—which eliminates the need to measure the reference and/or signal spectrum independently. Additionally, the disclosed calibration techniques are able to characterize the interferometer more accurately than previously achieved, and the disclosed retrieval procedures improve upon the existing techniques and are able to incorporate non-idealities such as fringe contrast and background.

The disclosed three-phase interferometric methods, device and systems can be used for various applications, including but not limited to laser pulse characterization, closed loop shaping for arbitrary waveform generators, measurement of extremely chirped pulses, and observation of pulse shapes at bandwidth limited resolution.

According to some embodiments, a minimum of three measurements are required to unambiguously determine the signal spectrum and phase. In the previous techniques with two interferograms, where $\psi$=[0,90] and the signal is weaker than the reference by a factor of at least 2, measuring the two interferograms and the signal spectrum is the most direct way to reconstruct the signal pulse, though the signal spectrum and phase can also be retrieved from measurements of the two interferograms and the reference spectrum. In contrast, according to the disclosed embodiments, measuring three interferograms (e.g., $\psi$=[−120,0,120]) results in an unambiguous reconstruction of the signal amplitude and phase when the signal strength at every wavelength is less than or equal to the reference strength. We term this approach three-phase spectral interferometry (3PSI).

In an example configuration, generation of $\psi$=[−120,0, 120] can be accomplished by launching signal and reference pulses into two of the input ports of an ideal 3×3 single mode fiber optic splitter. FIG. 1 illustrates a three-phase spectral interferometry system 100 in accordance with an example embodiment. FIG. 1 illustrates the unknown reference optical pulse 101 and unknown signal pulse 103 (after passing through one or more components described below) are provided to two inputs of the 3×3 splitter 113. The third input is unused. The three outputs of splitter 113 have the signal phase shifted by $\psi$=[−120,0,120] relative to the reference, and produce interferograms that can be measured by spectrometers 121, 123, 125.

Real-world single mode 3×3 splitters, however, have a phase that is highly dependent upon the input polarization, and any drift of the input polarization would consequently result in a drift of $\psi$. As illustrated in FIG. 1, this can be mitigated by using a polarization maintaining (PM) or polarizing (PZ) 3×3 splitter (as opposed to using, e.g., a single mode fiber splitter), provided that the light is launched into one of the primary guiding axes of the fiber. This can be accomplished with one or more free space optical polarizers 109, 111 (and optional waveplate or polarization controller 105, 107) preceding the launch into the PM fiber or PZ fiber, or with a sufficient length of PZ fiber to extinguish the undesired orthogonal polarization component. For example, the polarizers can ensure that a purely linear polarization is launched precisely into the guiding polarization axis of the PM or PZ fiber, and the polarization controller can be used to match the input optical polarization to the polarizer transmission axis for optimizing optical throughput. Additionally, since light can leak into the undesired orthogonal polarization component at the 3×3 junction, another set of free space optical polarizers 115, 117, 119 (and optional waveplate or polarization controller) or a sufficient length of PZ fiber can come immediately downstream of the 3×3 junction.

Alignment Considerations

Since polarization misalignment into a PM fiber or short PZ fiber results in a temporal double pulse, precise alignment of the input and output polarizers is imperative for high 3PSI fidelity operation. This can be accomplished by, for example, after shuttering the reference line, removing the signal line input polarizer, roughly aligning all output polarizers to within ~10° of the slow axis, and adjusting the input polarization until power through the output polarizers is maximized. Free space polarization controllers could be used, though using in-line fiber paddles or fiber squeezer controllers in the 3PSI signal or reference ports minimizes reflections. After reinstalling the signal input polarizer and aligning it for maximum throughput, the process can be repeated on the reference line. Finally, each of the 3 output polarizers can be aligned for maximum throughput.

For this alignment that measures power or energy, the use of a ~1 ps or shorter pulsed source will achieve an alignment superior to that performed with a continuous wave or long pulsed source. If a linear polarization is accurately launched into the slow axis of the 3×3 splitter, the 3×3 junction will still result in a few picosecond double pulse at the splitter output after 1 meter. If a short pulsed source is used, the double pulse will be two orthogonally polarized pulses, and aligning the output polarizer for maximum transmission results in aligning the polarizer to the fiber slow axis. If a long pulse or broadband CW laser is used, the coherent combination of the double pulses results in an output polarization that is not linear or aligned with the slow axis, and aligning the polarizer for maximum transmission may not result in aligning the polarizer to the slow axis.

Improper polarizer alignment will result in double pulses reaching the spectrometer, and an alternative alignment is possible to minimize the resulting double pulse interference fringes. The process includes, after shuttering the reference line, removing the signal line input polarizer, and roughly aligning all output polarizers to within ~10° of the slow axis, then adjusting the input polarization until power through the output polarizers is maximized. Next, the process includes iterating between aligning the output polarizers and polarization controller until interference fringes are minimized. The signal input polarizer is then reinstalled and adjusted for maximum throughput. For example, finding the alignment for minimum throughput and rotating 90 degrees is a sensitive technique for achieving the best alignment. The process is repeated on the reference line, with the exception that the output polarizers should already be well aligned. This alignment technique does not have a short pulse laser requirement, but it does require a broadband source. Examples of the broadband source are a narrowband tunable continuous wave (CW) laser that scans the full spectrum in a single capture, a broadband pulsed source, or a broadband CW source.

Minimizing the fringes while observing the raw spectrum is possible, though processing the raw spectrum to isolate the fringes increases sensitivity. The fringes can be isolated in the frequency domain by Fourier transforming the spectrum and masking out the frequencies corresponding to the fringes; summing the squared magnitude of the isolated frequencies provides a single amplitude value to minimize. As an alternative to masking in the Fourier domain, the real-time energy normalized spectrum can be subtracted from the starting alignment energy normalized spectrum; maximizing the summed squared magnitude of the spectral difference while observing that the ending alignment fringes are smaller than the starting alignment fringes minimizes the fringe amplitude.

Due to the fluctuating relative phase of the PM fiber slow and fast axes, the amplitude of double pulse fringes will change over the course of ~10s of seconds. Minimizing the fringe amplitude is independent of this fluctuating amplitude. Other fringes in the spectrum that may mimic this behavior may be due to double bounce back reflections that pass through the 3×3 splitter multiple times. Using angle polish cleaved (APC) terminated fibers and antireflection (AR) coatings on free space optics minimizes fringes due to reflection mechanisms.

Calibration of the System

In the real-world system, many non-ideal effects modulate the 3PSI results. To achieve high fidelity signal retrievals, all these effects must be accounted for and calibrated. Many effects can be diminished with hardware precautions or high-performance parts, though signal processing will generally still be required to fully mitigate these problems.

For each wavelength, the energy observed could differ on each spectrometer. Across wavelengths, the spectrometers may observe a non-uniform spectral response. The spectrometer may also have a point spread function at the camera that spans multiple pixels and overlaps with other resolvable wavelengths. The point spread function may also change across wavelengths. Spectral response effects could be due to the spectral response of the detector, manufacturing differences in the spectrometers, the 3×3 splitter having an imbalanced splitting ratio, fiber coupling losses, or other mechanisms. Point spread effects could be due to etaloning in the camera, from smudges on spectrometer optics, edge clipping on optic mounts, lens aberrations, alignment & focus problems, or other mechanisms. In the 3PSI system, each wavelength in each spectrometer has its own spectral response and point spread function (linear space-varying system). A calibration needs to be performed to normalize the spectral response and resolve each wavelength's point spread function.

Figure 2:
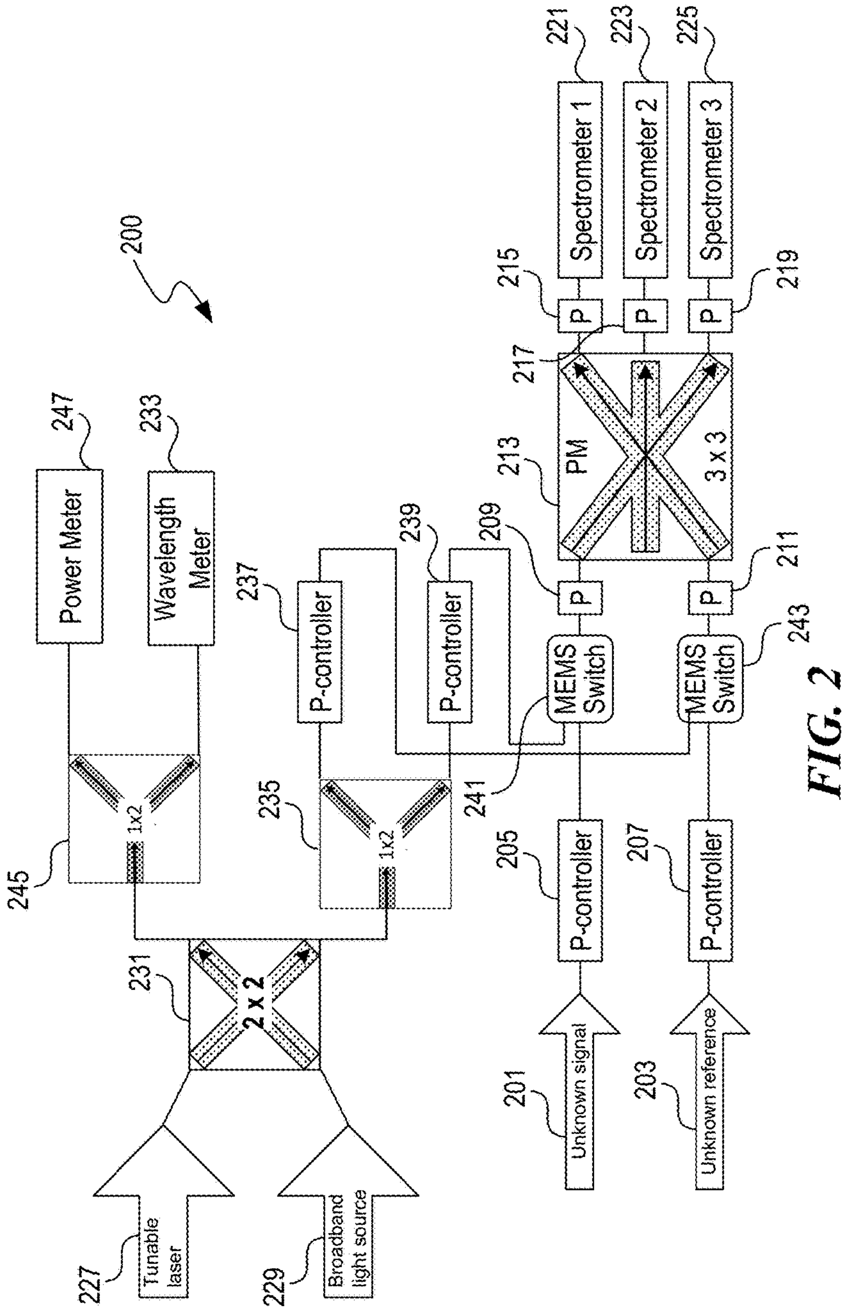
FIG. 2 illustrates a three-phase spectral interferometry system with an attached calibration system in accordance with an example embodiment.

FIG. 2 illustrates a 3PSI system 200 with an attached calibration system in accordance with an example embodiment. The system 200 includes a narrowband tunable laser, a wavemeter, a power meter, and a broadband laser (optional). The broadband light source (broadband laser) 229 is an optional component for expedient calibration of the signal port spectral response. The example system 200 also includes a 2×2 splitter 231 configured to receive the light from the tunable narrowband laser 227 at one input and light from the broadband light source 229 at another input. Each of the outputs of the 2×2 splitter 231 is provided to a corresponding 1×2 splitter 235, 245. One output of the 1×2 splitter 245 is provided to a wavelength meter 233 and another output of the 1×2 splitter 245 is provided to a power meter 247. The system 200 also includes additional polarization controllers 237, 239 that receive the outputs of the 1×2 splitter 235; the polarization controllers 237, 239 connect to optical (e.g., mems) switches 241, 243. Optical switches can select between measuring the calibration device or measuring the laser. The remaining components in FIG. 2 are similar to those described in connection with FIG. 1.

According to some embodiments, for each spectrometer 221, 223, 225 (Spectrometer$_X$, Spectrometer$_Y$, and Spectrometer$_Z$), to deconvolve each local point spread function as well as normalize the system's spectral response, a linear fit is performed using the normalized spectral response function at every resolvable wavelength. After switching off or shuttering the signal input port, the narrowband tunable laser 227 is connected to the reference port input of the 3PSI system and scanned across the spectrometer's measurable spectral range. A wavemeter 233 is used to closed-loop tune and pause the laser at each resolvable wavelength for image capture (slow closed loop scan), or alternatively to validate the wavelength at the time of image capture while the laser slowly scans across the range of wavelengths without pausing (fast open loop scan). Notably, the wavemeter 233 is used to measure the precise wavelength of the approximately uniformly spaced series of captures. The power meter 247 measures the calibration laser power at the time of every image capture. The power measurement done immediately before launch into the 3×3 fiber using a free space pickoff would provide the highest spectral power accuracy, though measuring upstream in the fiber circuit is more convenient. FIG. 1 illustrates a power meter 247 that is a separate component from the wavelength meter 233, which allows making power measurements more accurately (with lower noise levels). In some embodiments, however, a single component (e.g., a wavemeter that has a built-in power meter) may be used to measure both the power and the wavelength, which also eliminates the need for the 1×2 splitter 245. Referring back to the alignment procedure, after capturing an image at every resolvable wavelength, each image is background subtracted to remove stray light and dark current, denoised using masking and thresholding techniques, and then normalized to the calibration laser power measured by the power meter. A linear fitting model M is constructed by arranging each image into a column vector, and constructing a matrix that is P number of pixels rows by/number of images columns. The model may then be used to retrieve a spectrum from any arbitrary background subtracted image from that spectrometer by performing a linear regression.

A unique model, M, is constructed for each spectrometer as noted below. Let $M_X$ be a matrix of the denoised and normalized calibration imageset with P rows and I columns. Let $M_Y$ be a matrix of the denoised and normalized calibration imageset with P rows and I columns and let $M_Z$ be a matrix of the denoised and normalized calibration imageset with P rows and I columns, where X, Y and Z correspond to associated spectrometers.

$$RegressionMatrix_X = (M_X^T M_X)^{-1}$$
$$RegressionMatrix_Y = (M_Y^T M_Y)^{-1}$$
$$RegressionMatrix_Z = (M_Z^T M_Z)^{-1}$$
$$\text{Spectrum}_X = (M_X^T M_X)^{-1} M_X^T \text{Image}_X = RegressionMatrix_X M_X^T \text{Image}_X$$
$$\text{Spectrum}_Y = (M_Y^T M_Y)^{-1} M_Y^T \text{Image}_Y = RegressionMatrix_Y M_Y^T \text{Image}_Y$$
$$\text{Spectrum}_Z = (M_Z^T M_Z)^{-1} M_Z^T \text{Image}_Z = RegressionMatrix_Z M_Z^T \text{Image}_Z$$

In the above equations, $M^T$ is the transpose of M. Since the masking and thresholding techniques should make M populated by mostly zeros, using a sparse matrix datatype when defining M can substantially reduce computer memory usage. Since M is a fixed model, the regression matrix $(M^T M)^{-1}$ needs to be calculated only once after each calibration. Therefore, matrix multiplication of RegressionMatrix by the matrix product of $M^T$ and Image is a computationally fast spectrum retrieval method. For an image set that is well denoised by masking and/or thresholding techniques, the regression matrix is also sparse.

In some embodiments, an enhanced technique for fitting the spectra can be used that utilizes a non-negative-least-squares (NNLS) iterative solver. In the presence of noise or point spread function distortions, a linear fit using the calibration basis set of images may result in best-fit answers with negative spectral amplitudes. Using the non-negative constraint generates higher fidelity answers at the expense of computation time. Solutions obtained using NNLS may result in super resolution spectral retrievals with 10× improvement or more in the resolvable spectral line width.

In some embodiments, the above equations can be further modified to include an additional correction factor, represented as Cx, Cy and Cz, for each spectrometer:

$$RegressionMatrix_X = (M_X^T M_X)^{-1}$$
$$RegressionMatrix_Y = (M_Y^T M_Y)^{-1}$$
$$RegressionMatrix_Z = (M_Z^T M_Z)^{-1}$$
$$\text{Spectrum}_X = (M_X^T M_X)^{-1} M_X^T (C_X \text{ Image}_X) = RegressionMatrix_X M_X^T (C_X \text{ Image}_X)$$
$$\text{Spectrum}_Y = (M_Y^T M_Y)^{-1} M_Y^T (C_Y \text{ Image}_Y) = RegressionMatrix_Y M_Y^T (C_Y \text{ Image}_Y)$$
$$\text{Spectrum}_Z = (M_Z^T M_Z)^{-1} M_Z^T (C_Z \text{ Image}_Z) = RegressionMatrix_Z M_Z^T (C_Z \text{ Image}_Z)$$

The correction factors $C_X$, $C_Y$, and $C_Z$ can be obtained by using a uniform (white light) illumination, and determining deviations from the uniform detection spectra at each of the spectrometers. As noted earlier, to achieve a good interpolation, the basis set that is used to construct M can be densely sampled enough such that the interpolated regions above threshold observe signal for three or more consecutive images. In some embodiments, oversampling is used, which is particularly beneficial for this correction. Choosing to interpolate M onto a uniform frequency grid (instead of a uniform wavelength grid) is particularly efficient, since this eliminates the need for later interpolating the retrieved spectrum onto a uniform frequency grid. In addition to aiding the interpolation correction, oversampling enables another correction, denoted as the diagonal matrices $C_X$, $C_Y$, and $C_Z$ in the above equations. In this correction, we are renormalizing the spectral amplitude of the image to compensate for remaining jitter or amplitude bias in the basis set. Summing the interpolation corrected oversampled M or the interpolation corrected downsampled M across all images each results in a single image that would be equivalent to an underlying spectrum of unity value at every wavelength. The ratio of these two images, $M_{DownSampled}/M_{OverSampled}$, describes the correction to be applied at every pixel in the image. This can be expressed in linear algebra form:

$$C_X = \text{diag}(M_{DownSampledX} / M_{OverSampledX})$$
$$C_Y = \text{diag}(M_{DownSampledY} / M_{OverSampledY})$$
$$C_Z = \text{diag}(M_{DownSampledZ} / M_{OverSampledZ}).$$

The spectrum retrieval and super resolution portion of the calibration is generally applicable beyond 3PSI to any spectrometer application. Calibrating any spectrometer(s) by acquiring a basis set of narrow wavelength spectra, and then using that basis set for fitting arbitrary spectra, is a method that can be used in any application that has one or more spectrometers. For compact and low resolution spectrometers, this superresolution technique enables resolutions that are more typically associated with larger and more costly spectrometers. For high resolution spectrometers, this superresolution technique may push the resolution beyond what is otherwise available.

During the calibration procedure, the laser power observed by the spectrometer cameras can fluctuate due to calibration laser power fluctuations and nonuniform spectral response of the reference port, and a unique point spread function is generated at each wavelength in each spectrometer. The normalization step of the procedure normalizes by the measured tunable laser power at each wavelength and compensates for this noise component. The resulting linear regression simultaneously compensates for the nonuniform spectral response of the reference port and the wavelength dependent point spread function.

Using the linear regression approach, the number of resolvable wavelengths in the system is a tunable parameter. While tuning the number of resolvable wavelengths to spatially resolve adjacent point spread functions by approximately one full-width-half-maximum of separation is typical, adjusting this parameter for finer or broader resolvable spots trades spectral resolution for recovered signal/noise. This tradeoff is analogous to lowpass filtering after a deconvolution, where choosing a lowpass filter cutoff trades resolution for signal/noise. Since the number of resolvable wavelengths must be high enough to have some overlap between adjacent point spread functions, choosing lower spectral resolution requires defocusing the spectrometer camera or software blurring. Defocusing the camera provides an additional boon for signal/noise by spreading the signal to otherwise unused pixels in the lateral dimension to increase the signal dynamic range, and to get a sqrt(N) signal/noise boost.

Any light injected into the 3PSI reference port will generate identical spectrums on all 3 spectrometers after regression. However, light injected into the 3PSI signal port may not generate 3 identical spectrums. The energy normalized point spread function observed by the detector will be identical for both input ports, but the spectral response of the signal port may differ from the spectral response of the reference port.

For each spectral interferogram, there will be a unique amount of background signal. The static component of this background will be due to stray light entering the spectrometer enclosures and detector dark current, that can easily be subtracted away after data capture. The remaining background will depend upon the input signal strength. This dynamic background can be due to minor polarization mismatch of the signal and reference beams, resulting in a portion of the energy that does not interfere. In the case of integrating or averaging multiple interferograms, such as capturing many pulses into a single measured interferogram, relative phase jitter between signal and reference pulses results in reduced modulation amplitude. In the case where we have a short reference pulse and a signal pulse that temporally extends beyond the measurable record length, the portion of signal outside the record will not interfere.

For a spectral signal electric field, s, and a spectral domain reference electric field, r, with spectral domain intensities S and R, the three spectral interferograms X, Y, and Z are modeled as:

$$X = A_{RX}R + A_{SX}(S+B_S) + 2JB_X(A_{RX}R + A_{SX}S)^{1/2}\cos(\phi+\psi_X) = A_{RX}R + A_{SX}(S+B_S) + 2JB_X(A_{RX}R + A_{SX}S)^{1/2}\cos(\phi)$$

$$Y = A_{RY}R + A_{SY}(S+B_S) + 2JB_Y(A_{RY}R + A_{SY}S)^{1/2}\cos(\phi+\psi_Y)$$

$$Z = A_{RZ}R + A_{SZ}(S+B_S) + 2JB_Z(A_{RZ}R + A_{SZ}S)^{1/2}\cos(\phi+\psi_Z)$$

where $\text{Spectrometer}_X$, $\text{Spectrometer}_Y$, and $\text{Spectrometer}_Z$ respectively measure interferograms X, Y, and Z; $B_x$, $B_y$, and $B_z$ are vectors of values between 0 and 1 that respectively define the polarization mismatch backgrounds of interferograms X, Y, and Z, and have wavelength dependence upon the spectral extinction ratio of the 3×3 input and output polarizers; $B_S$ defines the signal content that is outside the record; $A_{RX}$, $A_{RY}$, and $A_{RZ}$ respectively define the reference spectral response amplitudes for interferograms X, Y, and Z; $A_{SX}$, $A_{SY}$, and $A_{SZ}$ respectively define the signal spectral response amplitudes for interferograms X, Y, and Z; $\psi_X$, $\psi_Y$, and $\psi_Z$ respectively define the wavelength dependent reference phase shifts of interferograms X, Y, and Z relative to $\psi_X$; $\phi$ defines the phase of the signal relative to the reference at each wavelength; J is a scalar value between 0 and 1 defines the modulation amplitude reduction in the case of integrating or averaging multiple interferograms, and is generally independent of wavelength. The term $\psi_X$ can be omitted for being defined as 0.

The reference port was calibrated for its spectral response and wavelength dependent point spread, as described earlier. Since the energy at each wavelength was captured during the calibration, the $A_{RN}$ parameters can be defined for each wavelength and spectrometer as $A_{RN}$=sum($\text{image}_N$)/$\text{Energy}_{Measured}$, where sum($\text{image}_N$) is the sum of the image prior to self-normalization on spectrometer N, and $\text{Energy}_{Measured}$ is the energy measured by the energy meter. For the signal port, the wavelength dependent point spread will be identical to the reference port, but the spectral responses, $A_{SN}$, may differ. The same procedure may be applied to the signal port to recover the signal spectral response. However, the spectral responses tend to drift over time, so having a more expedient method is desirable.

In an example alternative expedient procedure to estimate $A_{RN}$, and $A_{SN}$, a broadband laser is split using a 50/50 fiber splitter and connected to the signal and reference ports. Two sets of simultaneous image captures are performed by all three spectrometers while measuring on the signal port only (reference port shuttered) and the reference port only (signal port shuttered). After retrieving the spectrums from each spectrometer using the regression matrix, the spectral response parameters are calculated as:

$$A_{RY} = A_{RX}R_Y/R_X$$

$$A_{RZ} = A_{RX}R_Z/R_X$$

$$A_{SX} = (R_XS_X)/(L^2A_{RX})$$

$$A_{SY} = (R_XS_Y)/(L^2A_{RX})$$

$$A_{SZ} = (R_XS_Z)/(L^2A_{RX})$$

Where $R_X$, $R_Y$, and $R_Z$ is the broadband laser measured on reference port on spectrometers X, Y, and Z, respectively; $S_X$, $S_Y$, and $S_Z$ is the broadband laser measured on the signal port on spectrometers X, Y, and Z, respectively; L is the underlying spectrum of the broadband laser. In this expedient procedure, some estimate of $A_{RX}$ needs to be made. A convenient estimate of $A_{RX}$ is the $A_{RX}$ that was measured previously from the tunable laser scan, $A_{RX}$=sum($\text{image}_X$)/$\text{Energy}_{Measured}$. L must also be estimated, and a convenient estimate is to use the broadband laser spectrum on spectrometer X injected into the reference port, $L=R_X/A_{RX}$. Choosing poor estimates for these parameters, such as $L=A_{RX}=1$, will generally still produce acceptable 3PSI results for subjective assessments of the temporal record. Note that these equations are independent of the spectral response of the 50/50 splitter, as well as the split ratio of the splitter. The broadband laser does not need to have uniform spectrum, but it does need to have a stable spectrum across the time period of measurement on the signal and reference ports, and it also needs to have a high signal/noise at every measured wavelength. Alternatively, the tunable laser can be used in a fast scanning mode with a long camera integration time such that the simultaneously captured images observe the full spectral range, though the integrated spectrum may be less consistent across the reference and signal port captures.

In an alternate technique, the terms $A_{RX}$, $A_{RY}$, $A_{RZ}$, $A_{SX}$, $A_{SY}$, $A_{SZ}$, $\psi_Y$, and $\psi_Z$ (which are all calibration parameters) are measured with the aid of either the broadband STILETTO reference or the broadband calibration source prior to data collection. MEMS switches allow this laser to be injected into the 3×3 PM splitter in place of the signal and reference. For the signal and reference spectral response parameters, alternating the MEMS switches to capture sets of S and R on all three spectrometers yields a dataset that allows computation of the spectral response parameters as:

$$A_{RX} = R_{X\_Measured}/R_{Retrieved}$$

$$A_{RY} = R_{Y\_Measured}/R_{Retrieved}$$

$$A_{RZ} = R_{Z\_Measured}/R_{Retrieved}$$

$$A_{SX} = S_{X\_Measured}/S_{Retrieved}$$

$$A_{SY} = S_{Y\_Measured}/S_{Retrieved}$$

$$A_{SZ} = S_{Z\_Measured}/S_{Retrieved}$$

$R_{N\_Measured}$ and $S_{N\_Measured}$ are respectively the broadband source measured on the reference and signal ports on spectrometer N, $R_{Retrieved}$ is the R retrieved from performing a 3PSI spectrum retrieval on the set of measured references, and $S_{Retrieved}$ is the S retrieved from performing a 3PSI spectrum retrieval on the set of measured signals. Both retrievals are performed with all $A_{RN}$ and $A_{SN}$ parameters set to one. The correct 3PSI spectrum retrieval solution set should be chosen for the case of S>R or R>S. The above equations describe that the 3PSI spectrum retrieval should retrieve no signal in the case when the signal is shuttered, and should retrieve no reference when the reference is shuttered. Erroneously retrieving any signal or reference light from the 3PSI spectrum retrieval at any wavelength respectively results in a reduction in the recovered reference or signal at that wavelength. The ratio of the directly measured spectral response to the retrieved spectral response results in the spectral correction calibration parameter for each spectrometer and input port.

In an alternate expression, for a spectral signal electric field s and a spectral domain reference electric field r with spectral domain intensities S and R, the three spectral interferograms X, Y, and Z are modeled as:

$$X = B_x\left|r + s\sqrt{A_x}\, e^{i(\phi+\psi_X)}\right|^2 + (1 - B_x)(R + SA_x)$$

$$Y = B_y\left|r + s\sqrt{A_y}\, e^{i(\phi+\psi_y)}\right|^2 + (1 - B_y)(R + SA_y)$$

$$Z = B_z\left|r + s\sqrt{A_z}\, e^{i(\phi+\psi_z)}\right|^2 + (1 - B_z)(R + SA_z)$$

where $\text{Spectrometer}_X$, $\text{Spectrometer}_Y$, and $\text{Spectrometer}_Z$ respectively measure interferograms X, Y, and Z; $B_x$, $B_y$, and $B_z$ respectively define the backgrounds of interferograms X, Y, and Z as a fractional proportion of the combined energy, and has wavelength dependence upon the spectral extinction ratio of the 3×3 input and output polarizers; $A_X$, $A_Y$, and $A_Z$ respectively define the signal spectral response amplitudes for interferograms X, Y, and Z relative to the signal spectral response amplitude in interferogram X; $\psi_X$, $\psi_Y$, and $\psi_Z$ and respectively define the wavelength dependent reference phase shifts of interferograms X, Y, and Z relative to $\psi_X$. The term $\psi_X$ can be omitted for being defined as 0.

The reference port was calibrated for its spectral response and wavelength dependent point spread, as described earlier. For the signal port, the wavelength dependent point spread will be identical to the reference port, but the spectral response may differ. Since signal and reference are measured simultaneously when observing interferograms, the previous calibration procedure cannot be amended to compensate for both ports. However, the signal port's spectral response after regression for each spectrometer can be included in the interferogram model. Performing a spectrum and phase retrieval with a system of equations that includes these parameters compensates for the signal port response.

In an example procedure to measure $A_X$, $A_Y$, and $A_Z$, the signal and reference ports are switched off or shuttered. A broadband laser is connected to the signal input port, and a simultaneous image capture is performed by all 3 spectrometers. The broadband laser is then connected to the reference port, and another simultaneous image capture is performed by all 3 spectrometers. After retrieving the spectrum from each spectrometer using the regression matrix, $A_X$, $A_Y$, and $A_Z$ are calculated as:

$$A_X = \text{Spectrum}_{REFX}/\text{Spectrum}_{SIGX}$$

$$A_Y = \text{Spectrum}_{REFY}/\text{Spectrum}_{SIGY}$$

$$A_Z = \text{Spectrum}_{REFZ}/\text{Spectrum}_{SIGZ}$$

The broadband laser does not need to have uniform spectrum. Due to the ratiometric definitions of $A_X$, $A_Y$, and $A_Z$, the only requirements on the laser are that it generates a spectrum such that each resolvable wavelength is captured with high signal/noise at the time of capture. The tunable laser can be used in place of the broadband laser by capturing images at every resolvable wavelength (normalizing by the measured power at each wavelength is unnecessary).

Alternatively, the tunable laser can be used in a fast scanning mode with a long camera integration time such that the simultaneously captured images observe the full spectral range. With this alternate technique, there are no concerns about stray light outside the spectrometer's range causing background, and the resulting captured spectrum may be more uniform and have a high signal-to-noise ratio that the wideband laser. The only tradeoff is that the cameras may need to capture for a longer time. The longer capture times do not produce any significant limitations since the background can be appropriately subtracted for this longer integration time.

In an ideal (lossless) 3×3 splitter, $\psi$=[−120, 0, 120]. In real world splitters with ~1 dB of loss, $\psi$ values may have a wavelength dependent variation of ±10° or more from ideal. Precise knowledge of the $\psi$ values is imperative for later high fidelity spectrum and phase retrieval. To measure $\psi$, the broadband calibration laser output is optically split with a 1×2 splitter and configured to enter the signal and reference ports of the 3×3 splitter. Due to the temporal phase jitter of the light entering the signal and reference ports, $\phi$ will be random with each capture, with the range of random $\phi$ values typically exceeding one wave. Each wavelength in the interferogram varies sinusoidally with respect to $\phi$. Since the $\psi$ relationship between each pair of 3×3 output ports at each wavelength remains fixed, capturing many sets of simultaneous acquisitions of all three spectrometers yields a dataset that probes the ψ relationship across the full range of ϕ. For $\psi_Y$, and $\psi_Z$, there are four possible equations for each capture that could describe the possible values of ψ:

$$\psi_y = \pi - \sin^{-1}\left(\frac{-Xoff + X}{Xamp}\right) - \sin^{-1}\left(\frac{-Yoff + Y}{Yamp}\right)$$

$$\psi_y = \sin^{-1}\left(\frac{-Xoff + X}{Xamp}\right) - \sin^{-1}\left(\frac{-Yoff + Y}{Yamp}\right)$$

$$\psi_y = -\sin^{-1}\left(\frac{-Xoff + X}{Xamp}\right) + \sin^{-1}\left(\frac{-Yoff + Y}{Yamp}\right)$$

$$\psi_y = -\pi + \sin^{-1}\left(\frac{-Xoff + X}{Xamp}\right) + \sin^{-1}\left(\frac{-Yoff + Y}{Yamp}\right)$$

$$\psi_z = \pi - \sin^{-1}\left(\frac{-Xoff + X}{Xamp}\right) - \sin^{-1}\left(\frac{-Zoff + Z}{Zamp}\right)$$

$$\psi_z = \sin^{-1}\left(\frac{-Xoff + X}{Xamp}\right) - \sin^{-1}\left(\frac{-Zoff + Z}{Zamp}\right)$$

$$\psi_z = -\sin^{-1}\left(\frac{-Xoff + X}{Xamp}\right) + \sin^{-1}\left(\frac{-Zoff + Z}{Zamp}\right)$$

$$\psi_z = -\pi - \sin^{-1}\left(\frac{-Xoff + X}{Xamp}\right) + \sin^{-1}\left(\frac{-Zoff + Z}{Zamp}\right)$$

In the above equations, Xoff, Xamp, Yoff, Yamp, Zoff, and Zamp describe the offsets (off) and amplitudes (amp) of the randomly sampled sinusoids on the X, Y, and Z spectrometers. With a large enough random sampling of a sinusoid (typically >100 samples), the offset of a sinusoid can be estimated as the average of the maximum and minimum values of the samples, and the amplitude of a sinusoid can be estimated as ½ the range of samples. The offset and amplitude can alternatively be estimated by taking independent measurements of the broadband spectrum on the signal input with the reference input block and on the reference input with the signal input blocked.

To determine the correct $\psi_Y$, and $\psi_Z$, an iterative approach can be taken as follows:

1) Set an initial guess that the correct values are the ones closest to 120 degrees.
2) Select the answer from each sampling that is closest to the initial guess.
3) Update the initial guess with the median value of the selected set of answers from step 2.
4) Repeat steps 2 and 3 until the median value recovered in step 3 converges to ψ

For measuring the reference response (that went in part to generating the regression matrix) or the signal response (that is used to determine $A_X$, $A_Y$, and $A_Z$), we only require the laser to be stable enough to get good signal/noise across the spectrum. For measuring $\psi_Y$ and $\psi_Z$, the laser spectrum or spectral scan needs to be stable and repeatable enough such that good estimates for the offsets and amplitudes of the randomly sampled sinusoids can be estimated.

Signal Retrieval and Signal Processing

The three 3PSI interferogram equations can be solved numerically or analytically to retrieve R, S, and ϕ at every wavelength (analytical equations not shown). There are two possible solution sets for R, S, and ϕ at every wavelength. Given a priori knowledge of R or S (for example, knowing that the signal spectrum is weaker than the reference spectrum at every wavelength for measuring weak signals), the correct solution set is the one that conforms to the R and S a priori knowledge. Otherwise, the reference and signal spectrums can be independently measured by shuttering R to measure S or vice versa. The retrieval equations (numerical or analytical) are computationally unstable and noisy if any pair of $A_X$, $A_Y$, or $A_Z$ have a small absolute difference, so a tolerance comparison is made at this threshold. For wavelengths with the absolute difference below the tolerance, adding a small offset of, for example, 2×tolerance to one of the parameters in the affected pair prior to the computation results in a robust retrieval. The resulting bias added to the retrieved answer is typically below the noise floor.

The relative strength of R and S can be optimized for various applications. For weak signals, such as measuring the output of an optical arbitrary waveform generator, choosing a strong reference that fills the majority of the camera dynamic range results in a homodyne amplification of the signal at each wavelength. This homodyne amplification increases the sensitivity by approximately $2\sqrt{RS}$, which is a sensitivity boon of several orders of magnitude for weak signals. For strong signals, choosing R and S to each be ~25% of the camera dynamic range provides the maximum fringe visibility and dynamic range without saturating, though care must be taken to ensure that the relative signal strength is known for signal and reference at every wavelength. For a weak reference, such as measuring the output of a laser amplifier when only a weak oscillator is available as reference, choosing the signal to fill the majority of the camera dynamic range maximizes fringe visibility.

In some implementations, when recovering R, S, and ϕ, an initial guess will need to be made for the backgrounds $B_X$, $B_Y$, and $B_Z$. R and S will be retrieved with distortions when compared to their direct measurements (measuring R while shuttering S, or measuring S while shuttering R), and these background values can be optimized by iterating to minimize the distortions on the recovered R and S. These background parameters are stable for single shot measurements, and would only change due a drift in hardware alignment. In practice, choosing high extinction ratio polarizers makes these parameters conveniently approximated as close to 1. For multishot measurements, phase jitter between the reference and signal will reduce fringe visibility. This could be modeled as a random jitter parameter, J, that varies between 0 and 1, is different with each capture, and multiplies the background terms: $JB_X$, $JB_Y$, and $JB_Z$.

In some implementations, the reference pulse may come from a very stable source, such as a laser oscillator. In this case, measuring the reference spectra and then using this information in the retrieval provides new degrees of freedom in the retrieval. The three 3PSI interferogram equations can be solved numerically or analytically to retrieve S, ϕ, and J at every wavelength. Alternatively, if we have signal content outside the record, we can instead choose to numerically or analytically solve the three 3PSI interferogram equations for S, ϕ, and $B_S$ at every wavelength (as noted earlier, BS defines the signal content that is outside of the record). Solving for $B_S$ instead of J means that jitter will corrupt our retrievals, if jitter is present. Capturing single shot records would eliminate any jitter contributions. Retrievals with jitter may still produce acceptable 3PSI results for subjective assessments of the temporal records. For unstable reference sources, a separate calibrated spectrometer could be used to measure this reference simultaneously with the interferogram capture.

In some implementations, measuring the reference and signal spectra in addition to the interferograms provides additional degrees of freedom to analytically or numerically solve for $B_S$, ϕ, and J at every wavelength. For stable signal and reference sources, these can be separately measured on different shots. For unstable signal and/or reference sources, separate calibrated spectrometers could be used to measure reference and signal spectra simultaneously with the interferogram capture.

For implementations where $B_S$ is solvable, a local region of a much longer record can be observed. For long record optical waveforms, this is advantageous for observing high frequency deviations from the desired waveform due to amplified spontaneous emission or other noise sources. The record length can effectively be increased by scanning the reference delay and taking multiple captures. This delay can be achieved by optical delay means (for example, using a trombone delay stage), or by adjusting the electronic phase delay of the reference laser oscillator that is synchronizable to an external clock. Oscillator reference lasers that are not synchronized to the measured signal can also be used to observe longer records by precisely tracking the relative arrival times of the two pulses (e.g., via Lissajous phase tracking) and building the longer record from these record segments.

After the retrieval of R, S, and $\phi$ in the wavelength domain, Fourier transforming the frequency domain complex electric field signal generates the time domain complex electric field signal. Prior to Fourier transforming, masking the real and complex regions of the signal spectrum that have no signal amplitude reduces the noise that is Fourier transformed into the time domain. For regions of no signal on the edges of the spectrum, the S, R, and $\phi$ vectors may optionally be truncated to remove these points. After calculating the time domain squared magnitude of the signal, the signal amplitude may then again be Fourier filtered as desired.

The retrieved time domain signal may possess a strong noise feature at the center of the record, typically termed the 'coherent artifact.' This artifact is particularly prominent when the calibration parameters are biased from their true underlying experimental values. The resulting biased spectral domain signal retrieval generates a spike at the center of the time domain signal record with magnitude equal to the summed squared magnitude of the biased signal spectrum. The presence of a prominent coherent artifact in the time domain record is an indicator that the calibration was not performed correctly, was performed with low signal/noise, or that the originally well-calibrated parameters have changed since the time of calibration. Sometimes, discretization errors from the spectrometer(s) can also contribute to this coherent artifact. Many calibration parameters can be checked by measuring an exponentially decaying signal pulse generated using an etalon. Incorrect pulse time spacing indicates an improperly scaled spectral axis, and aliasing about the center of the record indicates $\psi$ calibration errors.

The retrieved time domain signal will have an amplitude apodised record, typically with a bell-curve shape. The time domain signal can be multiplied by the inverse of this apodization shape to retrieve an amplitude normalized record, though the record dependent signal/noise profile will remain unchanged. The apodization shape can be measured by scanning any signal pulse in time and measuring the retrieved amplitude at every temporal location. After apodization correction, record lengths exceeding the single shot record length can be generated by scanning the signal & reference delay and compiling a combined record across multiple measurements.

The fiber optic circuitry may bottleneck the amount of pulsed light that can enter the system due to nonlinear optical effects that happen in the fiber at high optical intensities. Aside from minimizing the fiber path length, one way to mitigate this intensity limit is by sending the reference and signal pulses through a free space etalon. The ringdown of signal and reference pulses results in a ringdown of interferograms that are integrated by the camera. The calibration process deconvolves any resulting multiple impulse pattern, though fidelity is preserved if each pulse delay in the ringdown is greater than the record length. Using identical etalons for the reference and signal minimizes phase drift and background.

An alternative method for mitigating high intensity nonlinear optical effects in fiber is to equally chirp the reference and signal pulses. Since equally chirped signal and reference pulses generate identical interferograms to unchirped signal and reference pulses, the recovered answer is identical. For known chirps imposed on the signal and reference, this method can also be used to measure signal pulses with chirps that would otherwise exceed the temporal record length. Applying the known reference chirp on the recovered signal as an additional step completes the signal recovery. For general measurement of chirped signals, applying a similar known chirp to the reference compresses the recovered signal to the highest signal/noise region of the record (the center), resulting in higher measurement fidelity compared to measuring with an unchirped reference.

A common practice on electronic optical recorders (such as a photodiode and oscilloscope) is to deconvolve the temporal impulse response. In the case of the spectral interferometer, this is equivalent to performing the reference and signal spectral response calibrations. If the 3PSI system imposes multi-bounce reflection aberrations on the reference or signal to distort them away from perfect impulses, then applying the reference spectral response correction (as part of the regression matrix) and the $A_X$, $A_Y$, $A_Z$ signal spectral response corrections compensates for these artifacts in the retrieval. If the reference contains multi-bounce reflection distortions prior to entering the 3PSI system, this is recovered in the reference spectrum and phase. What is not corrected for by the calibration is a non-flat spectral phase on the reference prior to entering the 3PSI system that is either not known or not corrected for after the retrieval. Additionally, multi-bounce distortions occurring exclusively in the calibration laser beam path will result in a calibration that imposes multi-bounce distortions on the recovered reference, which affects the recovered signal.

Figure 3:
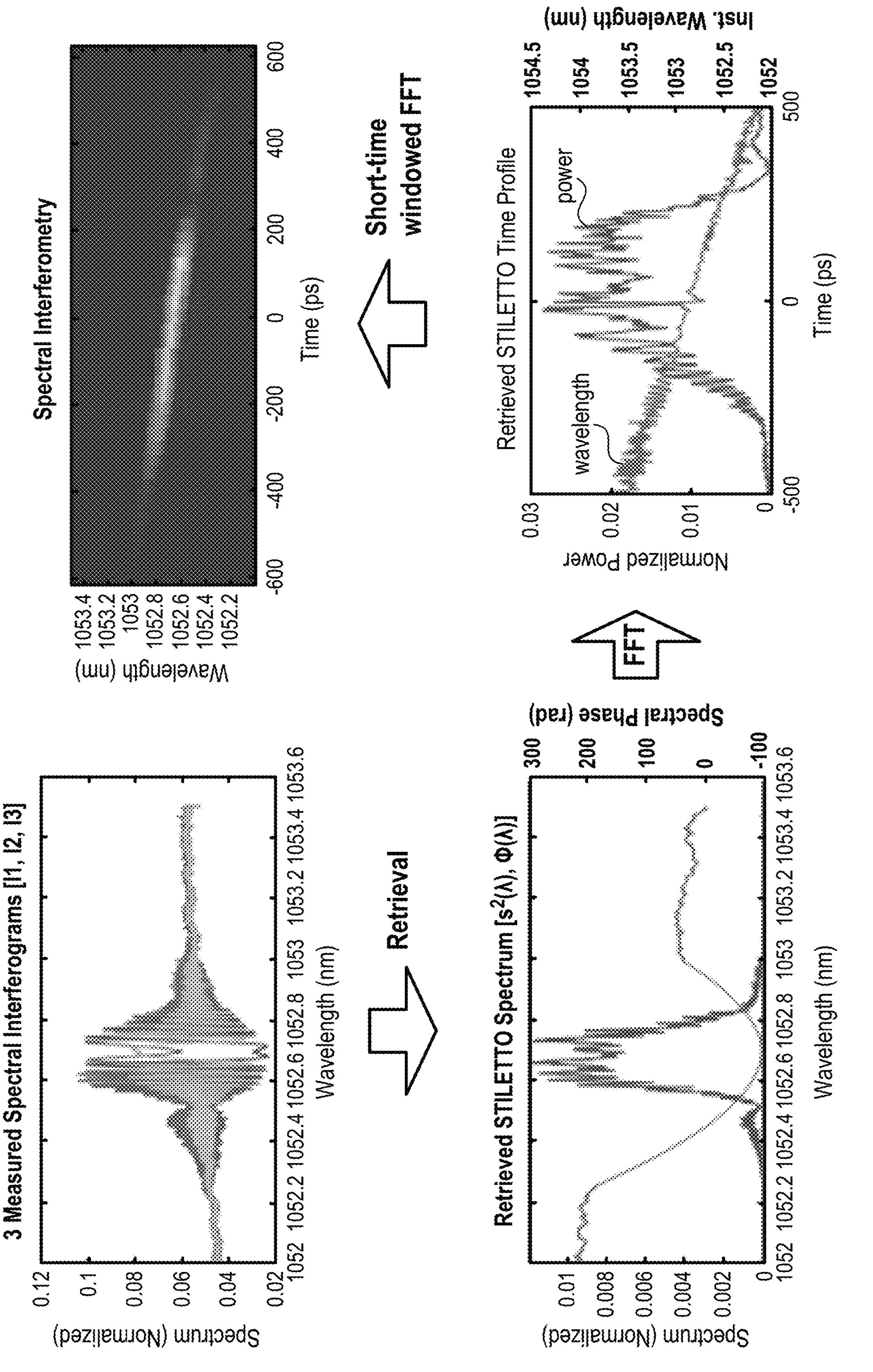
FIG. 3 illustrates an example of the various operations and associated results for a set of three-phase interferometry measurements that were performed in accordance an example embodiment.

FIG. 3 illustrates an example of the various operations and associated results for a set of three-phase interferometry measurements that were performed in accordance an example embodiment. The series of panels in FIG. 3 show that the disclosed techniques are capable of measuring chirped pulses. The top left panel in FIG. 3 illustrates the retrieved spectra for three interferograms versus wavelength. The lower left panel in FIG. 3 illustrates the squared amplitude, $s^2$, and phase, $\phi$, of the input optical signal as a function of wavelength that are obtained based on the operations disclosed in this patent document. The lower right panel in FIG. 3 illustrates the corresponding time domain signal showing both the normalized power and wavelength of the chirped pulse as a function of time. The top right panel in FIG. 3 shows a spectrogram visualization of the lower right panel.

Figure 4:
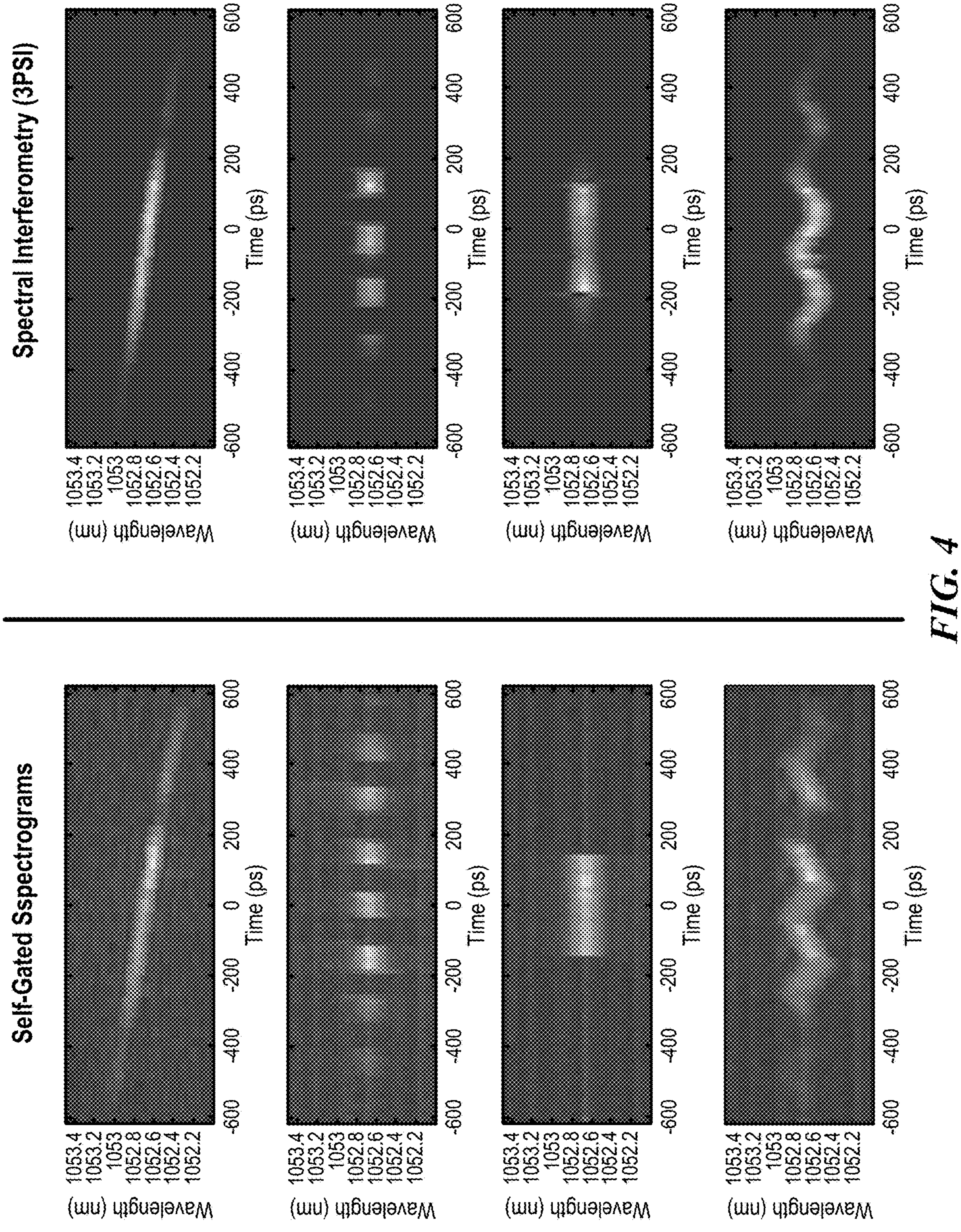
FIG. 4 illustrates a comparison of the results obtained via existing spectral techniques (left column panels) and those obtained using the disclosed three-phase interferometric techniques.

FIG. 4 illustrates a comparison of the results obtained from measuring the STILETTO arbitrary waveform generator output via self-gating spectral techniques (left column panels) and those obtained using the disclosed three-phase interferometric techniques. The comparison reveals artifacts that the self-gating technique could not resolve, as well as enhanced signal/noise that can be obtained using the three-phase interferometric techniques.

The disclosed embodiments can provide many advantages and benefits that include, but are not limited to: significantly improved spectral resolution (10×-100×) which results in correspondingly longer temporal record; improved accuracy of the retrieved spectral amplitude and phase in the presence of noise; the ability to, in addition to phase recovery, recover the magnitude of spectral components of the signal and reference with higher fidelity and sensitivity than measuring them separately, due to homodyne amplification; determination of characteristics of a signal without knowledge of reference signal characteristics; elimination of polarization-dependent phase effects that degrade performance; increased resolution of spectrometers; ability to tune the spectral resolution; insensitivity to fringe washout due to background from either polarization mismatch or measurement in the presence of phase jitter; the ability to accurately calibrate the interferometric system for very high fidelity and dynamic range; the ability to measure chirped signals including extremely chirped signals that are otherwise longer than record length.

Figure 5:
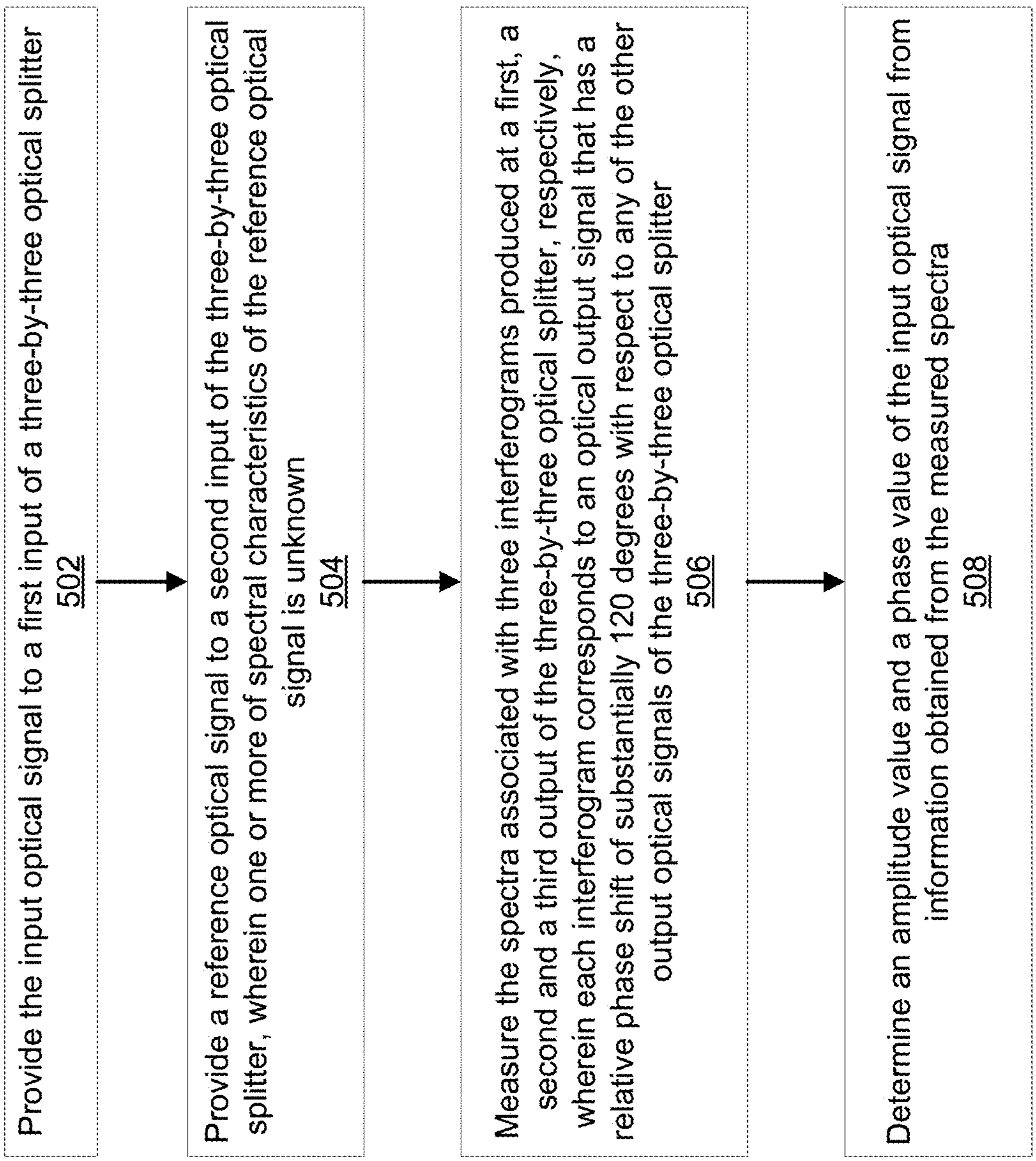
FIG. 5 illustrates a set of operations that can be carried out for determining characteristics of an input optical signal using a three-phase interferometric system in accordance with an example embodiment.

FIG. 5 illustrates a set of operations that can be carried out for determining characteristics of an input optical signal using a three-phase interferometric system in accordance with an example embodiment. At 502 the input optical signal is provided to a first input of a three-by-three optical splitter. At 504, a reference optical signal is provided to a second input of the three-by-three optical splitter. At 506, the spectra associated with three interferograms produced at a first, a second and a third output of the three-by-three optical splitter are measured. Each interferogram corresponds to an optical output signal that has a relative phase shift of substantially 120 degrees with respect to any of the other output optical signals of the three-by-three optical splitter. At 508, an amplitude value and a phase value of the input optical signal are determined from information obtained from measured spectra.

Figure 6:
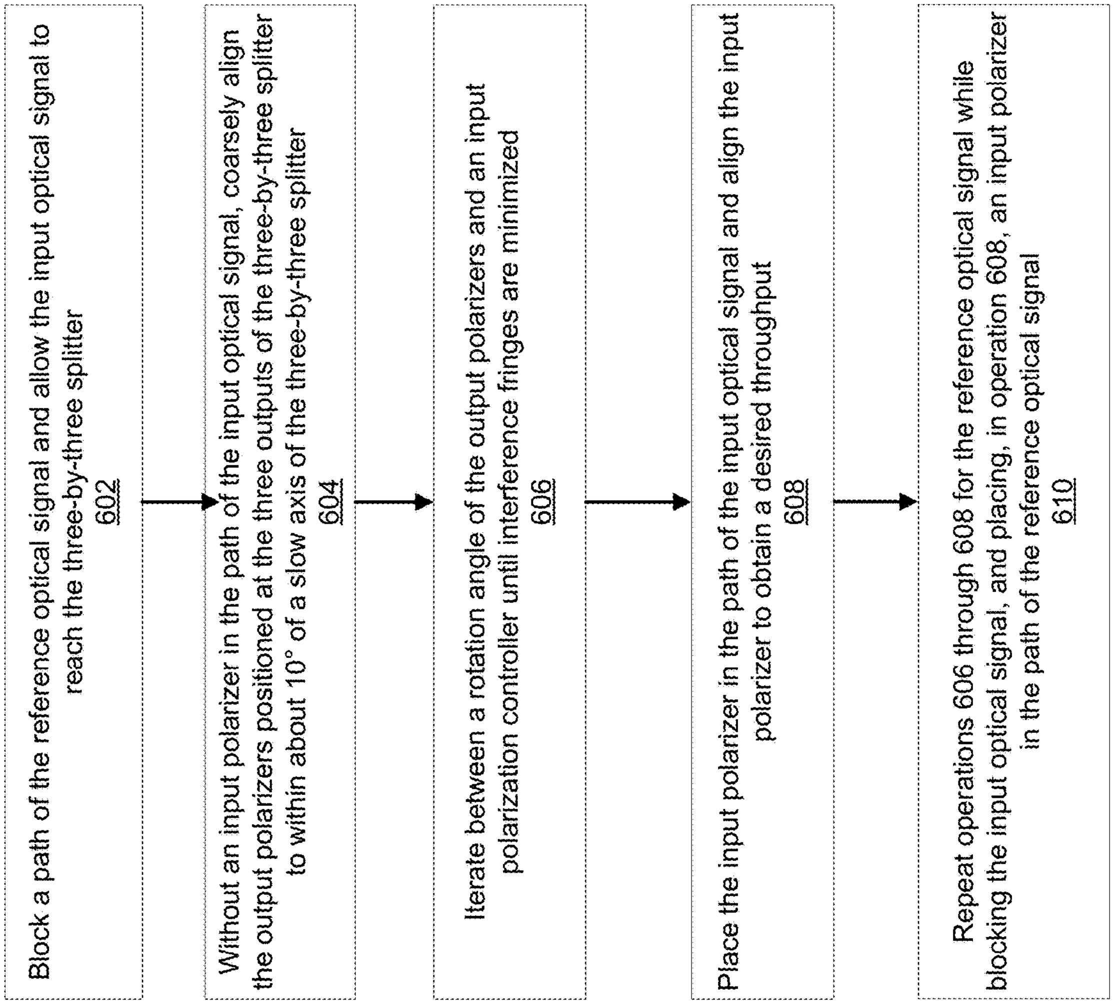
FIG. 6 illustrates a set of alignment operations for the three-phase interferometric systems in accordance with an example embodiment.

FIG. 6 illustrates a set of alignment operations for the three-phase interferometric systems in accordance with an example embodiment. These operations can be carried out prior to using the system for measuring the characteristics of the input signal. At 602, a path of the reference optical signal is blocked and the input optical signal is allowed to reach the three-by-three splitter. At 604, the input polarizer is removed from the path of the input optical signal, and the output polarizers positioned at the three outputs of the three-by-three splitter are coarsely aligned to within about 10° of a slow axis of the three-by-three splitter. The operations at 606 includes iterating between a rotation angle of the output polarizers and an input polarization controller until interference fringes are minimized. At 608, the input polarizer is placed in the path of the input optical signal and aligned for a desired (e.g., maximum) throughput. For example, finding the rotation angle of minimum throughput and then rotating 90° is a highly sensitive method for finding the angle of maximum transmission. At 610, operations 606 through 608 are repeated for the reference optical signal while blocking the input optical signal, and while placing another input polarizer in the path of the reference optical signal in operation 608.

Figure 7:
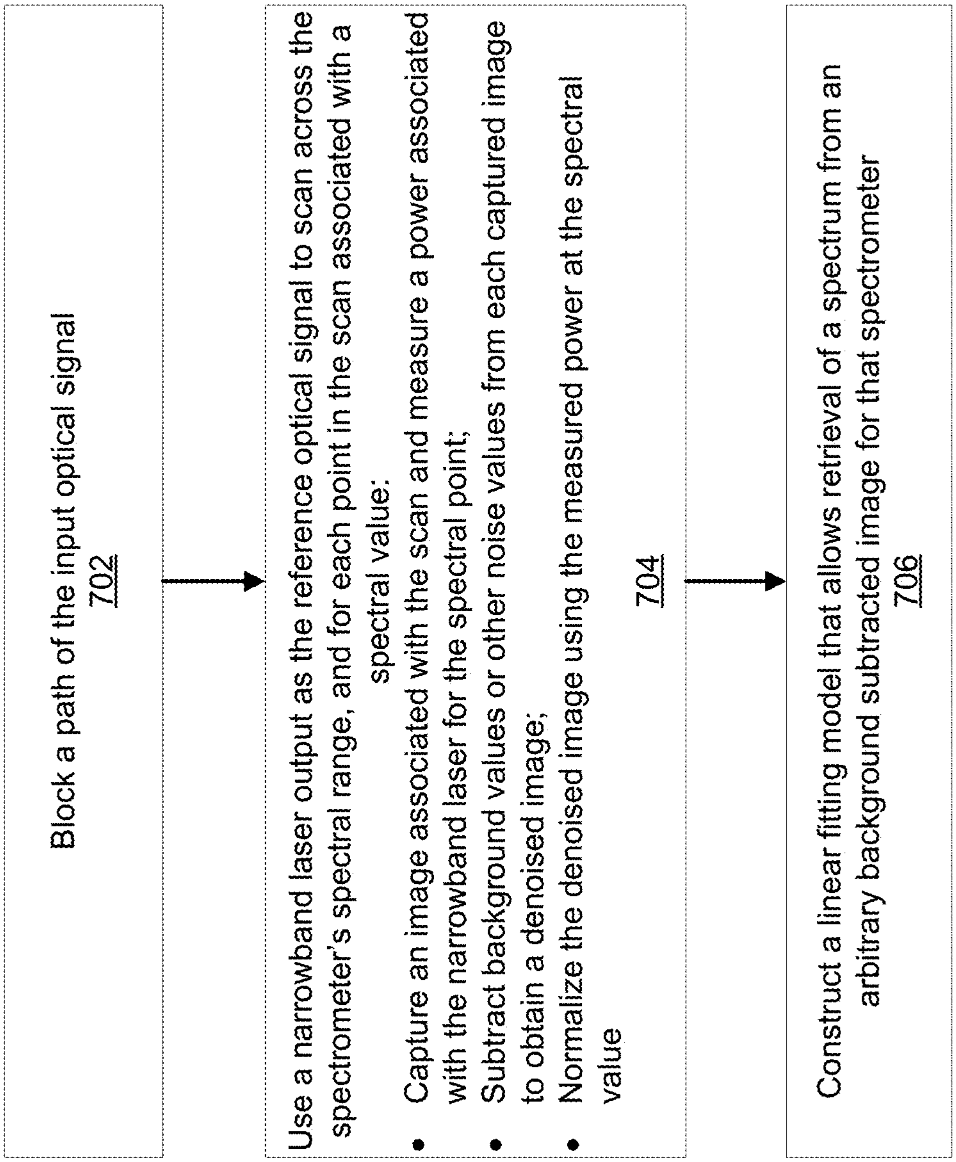
FIG. 7 illustrates a set of operations that can be carried out to calibrate the three-phase interferometric system in accordance with an example embodiment.

FIG. 7 illustrates a set of operations that can be carried out to calibrate the three-phase interferometric system in accordance with an example embodiment. These operations can be carried out prior to using the system for measuring the characteristics of the input signal. At 702, the input optical signal is blocked. At 704, using a narrowband laser output as the reference optical signal, the spectrometer's spectral range is scanned, and for each point in the scan associated with a spectral value: (1) an image associated with the scan is captured and a power associated with the narrowband laser for the spectral point is measured; (2) background values or other noise values are subtracted from each captured image to obtain a denoised image; (3) the denoised image is normalized using the measured power at the spectral value. At 706, a linear fitting model is constructed that allows retrieval of a spectrum from any arbitrary background subtracted image for that spectrometer.

An aspect of the disclosed embodiments relates to a three-phase interferometric system for measuring characteristics of an input optical signal, including: a three-output optical splitter including: a first input port configured to receive the input optical signal, a second input port configured to receive a reference optical signal, wherein one or more of spectral characteristics of the reference optical signal is unknown, and three output ports, each configured to produce an optical output signal based on the input and the reference optical signals, wherein each of a first, a second and a third optical signal produced by a corresponding output port has a relative phase shift of substantially 120 degrees with respect to any of the other output optical signals; and one or more optical detectors positioned to receive the first, the second and the third optical signals, and to measure spectra corresponding to three interferograms associated with the first, the second and the third optical signals and to allow determinations of an amplitude and a phase value of the input optical signal from the measured spectra.

In one example embodiment, a magnitude of the input optical signal is less than or equal to a magnitude of the reference optical signal at every wavelength within spectral bandwidth of the input optical signal. In another example embodiment, the three-output optical splitter is a three-by-three optical splitter and a third input of the three-by-three optical splitter is unused. In still another example embodiment, the three-by-three optical splitter comprises a polarization maintaining (PM) optical splitter or a polarizing optical (PZ) splitter. In yet another example embodiment, the three-phase interferometric system further includes one or more polarizers positioned prior to the first input port or the second input port to receive the input optical signal or the reference optical signal and to impart a particular polarization onto one or both of the input optical signal or the reference optical signal prior to reaching the first input port or the second input port.

According to another example embodiment, three-phase interferometric system includes one or more polarization controllers positioned before the one or more polarizers to receive the input optical signal or the reference optical signal and to impart a polarization adjustment onto one or both of the input optical signal or the reference optical signal prior to reaching the one or more polarizers. In one example embodiment, the three-phase interferometric system further includes one or more polarizers positioned after the first, the second or the third output ports to impart a particular polarization onto one or more of the output optical signals after exiting the three output ports. In another example embodiment, the one or more optical detectors include three spectrometers each configured to receive and measure one the spectra of the three interferograms.

In some example embodiments, the three-phase interferometric system further includes a calibration subsystem that includes: one or more light sources including a tunable laser source, a plurality of additional optical splitters, and a plurality of optical switches to allow either (a) the input optical signal and the reference optical signal to reach the first and the second input port of the three-output optical splitter, or (b) outputs of one of the additional optical splitters to reach the first and the second input port of the three-output optical splitter. In one example embodiment, the calibration subsystem further includes a wavelength meter configured to measure a wavelength of the tunable narrowband laser at one or more resolvable wavelengths, to validate a wavelength at a time of an image capture by the one or more detectors while the tunable laser is being scanned across a range of wavelengths, and an optical power meter configured to measure or validate an output power of the tunable narrowband laser at the time of the image capture.

Another aspect of the disclosed embodiments relates to an interferometric method for determining characteristics of an input optical signal using a three-phase interferometric system. The method includes providing the input optical signal to a first input of a three-by-three optical splitter, and providing a reference optical signal to a second input of the three-by-three optical splitter, wherein one or more of spectral characteristics of the reference optical signal is unknown. The method further includes measuring the spectra associated with three interferograms produced at a first, a second and a third output of the three-by-three optical splitter, respectively, wherein each interferogram corresponds to an optical output signal that has a relative phase shift of substantially 120 degrees with respect to any of the other output optical signals of the three-by-three optical splitter. The method additionally includes determining an amplitude value and a phase value of the input optical signal from information obtained from measured spectra. In one example embodiment, spectral amplitude of the reference optical signal is unknown. In another example embodiment a phase of the reference optical signal is known.

In some embodiments, the above noted method further includes preforming an inverse Fourier transform operation to obtain time domain characteristics of the input optical signal. According to some embodiments, the method further includes using one or both of a polarization controller or a polarizer positioned prior to inputs of the three-by-three optical splitter to impart a particular polarization onto the input optical signal and the reference optical signal prior entering the three-by-three optical splitter such that upon entry into the three-by-three optical splitter, the input optical signal and the reference optical signal have the same polarization. In another example embodiment, the above noted method further includes using one or more polarizers positioned at the output of the three-by-three optical splitter to remove undesired polarizations of optical signals that are output from the three-by-three optical splitter.

In one example embodiment, prior to providing the input optical signal and the reference optical signal for determining characteristics of the input optical signal, the method includes performing an alignment procedure including: (a) blocking a path of the reference optical signal and allowing the input optical signal to reach the three-by-three splitter, (b) without using an input polarizer in a path of the input optical signal, coarsely aligning the output polarizers positioned at the three outputs of the three-by-three splitter to within about 10° of a slow axis of the three-by-three splitter, (c) iterating between a rotation angle of the output polarizers and an input polarization controller until interference fringes are minimized, (d) placing the input polarizer in the path of the input optical signal and aligning the input polarizer to obtain a desired throughput, and (e) repeating operations (c) through (d) for the reference optical signal while blocking the input optical signal, while placing a corresponding input polarizer in a path of the reference optical signal in operation (d).

According to an example embodiment, obtaining a desired throughput includes obtaining a maximum throughput at the input polarizers. In another example embodiment, the calibration method includes using a pulsed light source for generating the input optical signal and the reference optical signal. In another example embodiment, the above noted calibration method includes using a broadband optical source.

In another example embodiment, prior to providing the input optical signal and the reference optical signal for determining characteristics of an input optical signal, a calibration procedure is performed to characterize one or more of the following: spectral response variations of detectors or spectrometers used for measuring the spectra, variations associated with the three-by-three splitter including an imbalanced splitting ratio, point spread function variations across multiple spectrometers used for measuring interferograms output from the 3×3 optical splitter, or overlap of point-spread function of the detectors across multiple pixels corresponding to different resolvable wavelengths.

According to another example embodiment, the calibration procedure includes normalizing the spectral response of the detectors and resolving the point spread function at each of the wavelengths. In one example embodiment, the calibration procedure includes, for each spectrometer in the three-phase interferometric system, deconvolving each local point spread function, normalizing the spectral response, and performing a fit at every resolvable wavelength. Performing the fit can include performing a linear fit or a non-linear fit. In another example embodiment, the calibration procedure includes, for each spectrometer in the three-phase interferometric system: (a) blocking a path of the input optical signal, (b) using a narrowband laser output as the reference optical signal to scan across the spectrometer's spectral range, and for each scan associated with a spectral value, (b-1) capturing an image associated with the scan and measuring a power associated with the narrowband laser for the spectral point, (b-2) subtracting background values or other noise values from each captured image to obtain a denoised image, (b-3) normalizing the denoised image using the measured power at the spectral value, and (c) constructing a linear fitting model that allows retrieval of a spectrum from any arbitrary background subtracted image for that spectrometer.

In one example embodiment, operation (b-3) includes performing a masking and thresholding operation. According to another example embodiment, the calibration procedure includes using a regression matrix to obtain the spectrum from a background subtracted image according to the linear fitting model. In yet another example embodiment, the calibration procedure includes, for each spectrometer, constructing a matrix corresponding to a denoised and normalized calibration image set, and constructing a regression matrix, wherein the regression matrix is computed only once after each calibration. In still another example embodiment, both the matrix corresponding to the denoised and normalized calibration image set and the regression matrix are sparse matrices.

In another example embodiment, the calibration procedure includes using a non-negative-least-squares (NNLS) iterative solver. In one example embodiment, the calibration procedure includes tuning a number of resolvable wavelengths of the three-phase interferometric system to spatially resolve adjacent point spread functions using a separation based on a parameter corresponding to full-width-half-maximum (FWHM), wherein a separation that is less than FWHM provides a larger number of resolvable wavelengths than a separation that is larger than FWHM.

According to an example embodiment, each of the three interferograms can be determined based on parameters obtained as part of the calibration procedure, the parameters including: background of the interferogram, signal spectral response amplitudes for the interferogram, or wavelength-dependent reference phase shift of the interferogram with respect to another one of the three interferograms. In one example embodiment, determining the signal spectral response amplitude for all three interferograms includes: connecting a broadband laser to the signal input port, simultaneously capturing images on three spectrometers, using a regression matrix to retrieve the spectrum from for each spectrometer, and obtaining the signal spectral response amplitude for each interferogram based on a ratio of a pair of retrieved spectra.

In some example embodiments, determining the signal spectral response amplitudes for all three interferograms includes: switching off or otherwise blocking the input optical signal and the reference optical signal, connecting a broadband laser to a signal input port, simultaneously capturing images on three spectrometers, connecting the broadband laser to a reference input port, simultaneously capturing images on three spectrometers, using a regression matrix to retrieve the spectrum from for each spectrometer, and obtaining the signal spectral response amplitude for each interferogram based on a ratio of a pair of retrieved spectra.

In some example embodiments, the wavelength-dependent reference phase shifts associated with two of the interferograms relative to the third interferogram are determined based on at least: splitting an output of a broadband calibration laser source into two signals that enter the first and the second inputs of the three-by-three splitter, making multiple spectral measurements of the three interferograms at the output of the three-by-three splitter, and using the spectral measurements of the three interferograms to obtain the wavelength-dependent reference phase shifts associated with two of the interferograms. According to some example embodiments, the wavelength-dependent reference phase shifts associated with two of the interferograms obtained from the measured interferograms enables a determination of how far the wavelength-dependent reference phase shift deviates from 120 degrees. In one example embodiment, obtaining the wavelength-dependent reference phase shifts associated with two of the interferograms includes solving a set of equations based on randomly sampled sinusoids associated with the measured interferogram, and wherein solving the set of equations includes an iterative process of setting an initial guess for wavelength-dependent reference phase shifts, selecting an answer that is closest to the initial guess, updating the initial guess with a median value and repeating the selecting and the updating until convergence is achieved.

In some example embodiments, determining the amplitude value and the phase value of the input optical signal includes: solving an equation that has multiple solutions with respect to an amplitude of the reference optical signal, an amplitude of the input optical signal, and a relative phase between the reference optical signal and the input optical signal, and selecting a solution that agrees with a priori knowledge of relative signal strengths of the reference optical signal and the input optical signal. In one example embodiment, the a priori knowledge includes one of the following: a spectrum of the input optical signal is weaker than a spectrum of the reference optical signal at every wavelength within a spectral bandwidth of the input optical signal, or a spectrum of the input reference signal is weaker than a spectrum of the input optical signal at every wavelength within a spectral bandwidth of the input optical signal.

In another example embodiment, determining the amplitude value and the phase value of the input optical signal includes: performing measurements to obtain a relative strength of the input optical signal with respect to the reference optical signal, solving an equation that has multiple solutions with respect to an amplitude of the reference optical signal, an amplitude of the input optical signal, and a relative phase between the reference optical signal and the input optical signal, and selecting a solution that agrees with the obtained relative strength of the input optical signal with respect to the reference optical signal.

In yet another example embodiment, determining the amplitude value and the phase value of the input optical signal for multi-shot measurements includes providing a random jitter model to compensate for variations in hardware alignment between each measurement of the multi-shot measurements. In another example embodiment, determining the amplitude and phase of the input optical signal includes using a modified Fourier transform matrix to account for a nonlinear frequency grid spacing. In still another example embodiment, the method includes using an interpolation procedure to provide a uniformly spaced frequency grid. For example, the interpolation procedure can include using one of a spline, linear, nearest neighbor, cubic spline, or Fourier interpolation. According to some example embodiment, the method, prior to performing the inverse Fourier transform operation, includes masking real and complex regions of an obtained spectra of the input optical signal that has no signal amplitude. In some embodiments, preforming the inverse Fourier transform operation produces time domain signal amplitudes having an apodised profile, and the method further includes multiplying the time domain signal by an inverse of the apodised profile. In still another example embodiment, the method comprises introducing an equal amount of chirp to the input optical signal and the reference optical signal prior to entry to the three-by-three optical splitter to mitigate high intensity nonlinear optical effects of optical fiber components.

Figure 8:
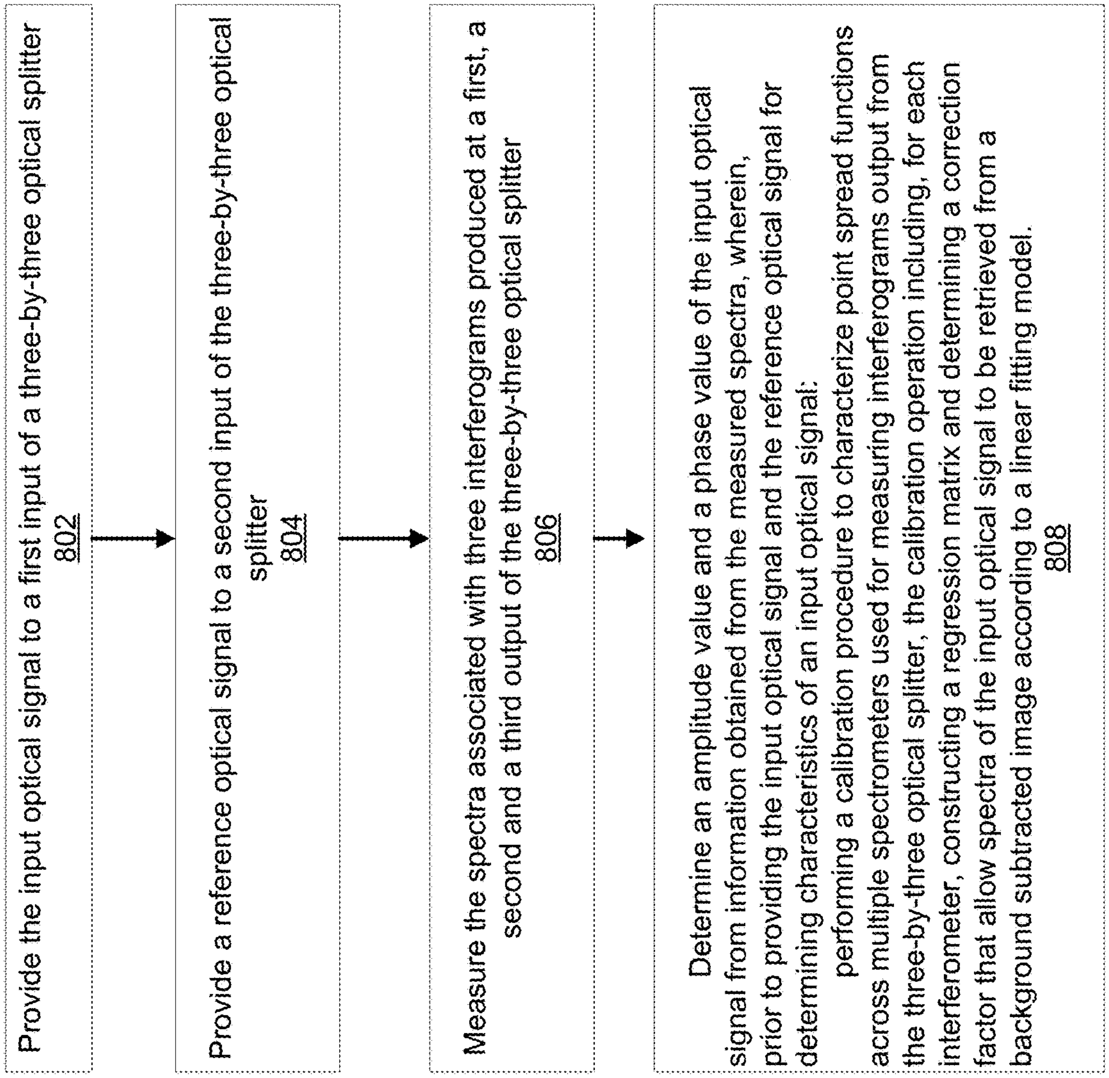
FIG. 8 illustrates a set of operations that can be used for determining characteristics of an input optical signal using a three-phase interferometric system in accordance with another example embodiment.

FIG. 8 illustrates a set of operations that can be used for determining characteristics of an input optical signal using a three-phase interferometric system in accordance with another example embodiment. At 802, the input optical signal is provided to a first input of a three-by-three optical splitter. At 804, a reference optical signal is provided to a second input of the three-by-three optical splitter. At 806, the spectra associated with three interferograms that produced at a first, a second and a third output of the three-by-three optical splitter are measured. At 808, an amplitude value and a phase value of the input optical signal is determined from information obtained from the measured spectra, wherein: prior to providing the input optical signal and the reference optical signal for determining characteristics of an input optical signal, performing a calibration procedure to characterize point spread functions across multiple spectrometers used for measuring interferograms output from the three-by-three optical splitter, the calibration operation including, for each interferometer: constructing a regression matrix and determining a correction factor that allow spectra of the input optical signal to be retrieved from a background subtracted image according to a linear fitting model.

In one example embodiment, the correction factor is determined using a white light or broadband source as input to the three-by-three optical splitter, measuring a detected spectra by each spectrometer, and determining a deviation of the measured spectra from a uniform spectra for each spectrometer. In another example embodiment, the correction factor is obtained based on a ratio of a downsampled image to an oversampled image. In yet another example embodiment, the above noted operations include, for each spectrometer in the three-phase interferometric system, deconvolving each local point spread function, normalizing the spectral response, and performing the linear fit at every resolvable wavelength. In still another example embodiment, the regression matrix and the correction factor are computed only once per calibration procedure.

According to another example embodiment, each of the three interferograms is determined based on parameters obtained as part of the calibration procedure. The parameters relate to: polarization mismatch backgrounds of the interferograms, a signal content that is outside of record length, reference spectral response amplitudes for the interferograms, or signal spectral response amplitudes for the interferograms background of the interferogram, signal spectral response amplitudes for the interferograms. In another example embodiment, each of the three interferograms is a function of a plurality of parameters that include a first parameter that defines spectral response amplitude of the reference optical signal for the corresponding interferogram, and a second parameter that defines spectral response amplitude of the input optical signal for the corresponding interferogram.

In one example embodiment, determining the first and the second parameter values is performed as part of the calibration procedure that injects a broadband source into the first and the second input of the three-by-three optical splitter one at a time and making corresponding spectral measurements, wherein the first and the second parameter values are determined based on the following relationships:

$$A_{RN} = R_{N\_Measured}/R_{Retrieved}, \text{ and } A_{SN} = S_{N\_Measured}/S_{Retrieved}$$

wherein: $A_{RN}$ represents the first parameter for the $N^{th}$ spectrometer, where N has values of 1, 2 and 3, $A_{SN}$ represents the second parameter for the $N^{th}$ spectrometer, where N has values of 1, 2 and 3, $S_{N\_Measured}$ and $R_{N\_Measured}$ are respectively spectra of the broadband source measured on spectrometer N at the corresponding output of the three-by-three optical splitter, $S_{Retrieved}$ is a retrieved signal spectra computed using all N spectral measurements associated with the broadband source that is injected into the first input of the three-by-three optical splitter, and $R_{Retrieved}$ is a retrieved reference signal spectra computed using all N spectral measurements associated with the broadband source that is injected into the second input of the three-by-three optical splitter. In another example embodiment, the retrieved signal spectra and the retrieved reference spectra are computed by setting all $A_{RN}$ and $A_{SN}$ to one.

In yet another example embodiment, the reference optical signal originates from a stable optical source, and prior to, or at the same time as, the above noted operations, in determining the amplitude value and the phase value of the input optical signal, measure a spectral of the reference optical signal and use the measured spectra of the reference optical signal to determine spectra and a phase value of the input optical signal at a plurality of wavelengths. In still another example embodiment, the above operations further include determining a jitter value.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest. The communications between the disclosed detectors and the processors may be carried out via near field communication (NFC) protocols.

The processing devices that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

We claim:

1. An interferometric method for determining characteristics of an input optical signal using a three-phase interferometric system, comprising:

providing the input optical signal to a first input of a three-by-three optical splitter;

providing a reference optical signal to a second input of the three-by-three optical splitter;

measuring spectra associated with three interferograms produced at a first, a second and a third output of the three-by-three optical splitter using a plurality of spectrometers; and determining an amplitude value and a phase value of the input optical signal from information obtained from the measured spectra, wherein:

prior to providing the input optical signal and the reference optical signal for determining characteristics of an input optical signal, performing a calibration procedure to characterize point spread functions across the plurality of spectrometers used for measuring interferograms output from the three-by-three optical splitter, the calibration operation including, for each interferometer:

constructing a regression matrix and determining a correction factor that allow spectra of the input optical signal to be retrieved from a background subtracted image according to a linear fitting model, wherein the regression matrix is constructed from a plurality of calibration images acquired at multiple wavelengths and is configured to compensate for wavelength-dependent point spread function variations and spectral response variations of each spectrometer so that the retrieved spectra are corrected for non-uniform detector response and wavelength-dependent spreading of interferogram energy across detector pixels.

2. The method of claim 1, wherein the correction factor is determined using a white light or broadband source as input to the three-by-three optical splitter, measuring a detected spectra by each spectrometer, and determining a deviation of the measured spectra from a uniform spectra for each spectrometer.

3. The method of claim 1, wherein the correction factor is obtained based on a ratio of a downsampled image to an oversampled image.

4. The method of claim 1, comprising, for each spectrometer in the three-phase interferometric system, deconvolving each local point spread function, normalizing the spectral response, and performing the linear fit at every resolvable wavelength.

5. The method of claim 1, wherein the regression matrix and the correction factor are computed only once per calibration procedure.

6. The method of claim 1, wherein each of the three interferograms is determined based on parameters obtained as part of the calibration procedure, the parameters relating to:

polarization mismatch backgrounds of the interferograms, a signal content that is outside of record length, reference spectral response amplitudes for the interferograms, or signal spectral response amplitudes for the interferograms.

7. The method of claim 1, wherein each of the three interferograms is a function of a plurality of parameters including:

a first parameter that defines spectral response amplitude of the reference optical signal for the corresponding interferogram, and a second parameter that defines spectral response amplitude of the input optical signal for the corresponding interferogram.

8. An interferometric method for determining characteristics of an input optical signal using a three-phase interferometric system, comprising:

providing the input optical signal to a first input of a three-by-three optical splitter;

providing a reference optical signal to a second input of the three-by-three optical splitter;

measuring spectra associated with three interferograms produced at a first, a second and a third output of the three-by-three optical splitter using a plurality of spectrometers, each of the three interferograms being a function of a plurality of parameters including a first parameter that defines a spectral response amplitude of the reference optical signal for the corresponding interferogram and a second parameter that defines a spectral response amplitude of the input optical signal for the corresponding interferogram, and determining an amplitude value and a phase value of the input optical signal from information obtained from the measured spectra, wherein:

prior to providing the input optical signal and the reference optical signal for determining characteristics of an input optical signal, performing a calibration procedure to characterize point spread functions across the plurality of spectrometers used for measuring interferograms output from the three-by-three optical splitter, the calibration operation including, for each interferometer:

constructing a regression matrix and determining a correction factor that allow spectra of the input optical signal to be retrieved from a background subtracted image according to a linear fitting model; and determining the first and the second parameter values as part of the calibration procedure that injects a broadband source into the first and the second input of the three-by-three optical splitter one at a time and making corresponding spectral measurements, wherein the first and the second parameter values are determined based on the following relationships:

$$A_{RN} = R_{N\_Measured}/R_{Retrieved}, \text{ and}$$

$$A_{SN} = S_{N\_Measured}/S_{Retrieved}$$

wherein:

$A_{RN}$ represents the first parameter for the $N^{th}$ spectrometer, where N has values of 1, 2 and 3, $A_{SN}$ represents the second parameter for the $N^{th}$ spectrometer, where N has values of 1, 2 and 3, $S_{N\_Measured}$ and $R_{N\_Measured}$ are respectively spectra of the broadband source measured on spectrometer N at the corresponding output of the three-by-three optical splitter, $S_{Retrieved}$ is a retrieved signal spectra computed using all N spectral measurements associated with the broadband source that is injected into the first input of the three-by-three optical splitter, and $R_{Retrieved}$ is a retrieved reference signal spectra computed using all N spectral measurements associated with the broadband source that is injected into the second input of the three-by-three optical splitter.

9. The method of claim 8, wherein the retrieved signal spectra and the retrieved reference spectra are computed by setting all $A_{RN}$ and $A_{SN}$ to one.

10. The method of claim 1, wherein the reference optical signal originates from a stable optical source, and wherein prior to, or at the same time as, determining the amplitude value and the phase value of the input optical signal, measuring spectra of the reference optical signal and using the measured spectra of the reference optical signal to determine spectra and a phase value of the input optical signal at a plurality of wavelengths.

11. The method of claim 10, further including determining a jitter value.

12. A device for determining characteristics of an input optical signal, comprising:

a processor and a non-transitory memory with instructions stored thereon, wherein the instructions upon execution by the processor cause the processor to:

measure spectra associated with three interferograms produced at a first, a second and a third output of a three-by-three optical splitter using a plurality of spectrometers, wherein the three-by-three optical splitter is configured to receive a reference optical signal and the input optical signal at two different input ports thereof; and determine an amplitude value and a phase value of the input optical signal from information obtained from the measured spectra, wherein:

prior to determining an amplitude value and a phase value of the input optical signal, the instructions upon execution by the processor configure the processor to perform a calibration procedure to characterize point spread functions across the plurality of spectrometers used for measuring interferograms output from the three-by-three optical splitter, the calibration operation including, for each interferometer:

constructing a regression matrix and determining a correction factor that allow spectra of the input optical signal to be retrieved from a background subtracted image according to a linear fitting model, wherein the regression matrix is generated from calibration images acquired at multiple wavelengths and is configured to compensate for wavelength-dependent point spread function distortions and non-uniform spectral response of each spectrometer in retrieving spectra associated with the interferograms.

13. The device of claim 12, wherein the instructions upon execution by the processor cause the processor to determine the correction factor, when a white light or broadband source is provided as input to the three-by-three optical splitter, by determining a deviation of a measured spectra by each spectrometer from a uniform spectra.

14. The device of claim 12, wherein the correction factor is obtained based on a ratio of a downsampled image to an oversampled image for application at every pixel in the image.

15. The device of claim 12, wherein the instructions upon execution by the processor cause the processor to, for each spectrometer in the three-phase interferometric system, deconvolve each local point spread function, normalize the spectral response, and perform the linear fit at every resolvable wavelength.

16. The device of claim 12, wherein the instructions upon execution by the processor cause the processor to determine each of the three interferograms based on parameters obtained as part of the calibration procedure, the parameters relating to:

polarization mismatch backgrounds of the interferograms, a signal content that is outside of record length, reference spectral response amplitudes for the interferograms, or signal spectral response amplitudes for the interferograms.

17. The device of claim 12, wherein each of the three interferograms is a function of a plurality of parameters including:

a first parameter that defines spectral response amplitude of the reference optical signal for the corresponding interferogram, and a second parameter that defines spectral response amplitude of the input optical signal for the corresponding interferogram.

18. The device of claim 17, wherein the instructions upon execution by the processor cause the processor to:

determine the first and the second parameter values as part of the calibration procedure that injects a broadband source into the first and the second input of the three-by-three optical splitter one at a time and obtain corresponding spectral measurements, wherein the first and the second parameter values are determined based on the following relationships:

$$A_{RN} = R_{N\_Measured}/R_{Retrieved}, \text{ and}$$

$$A_{SN} = S_{N\_Measured}/S_{Retrieved}$$

wherein:

$A_{RN}$ represents the first parameter for the $N^{th}$ spectrometer, where N has values of 1, 2 and 3, $A_{SN}$ represents the second parameter for the $N^{th}$ spectrometer, where N has values of 1, 2 and 3, $S_{N\_Measured}$ and $R_{N\_Measured}$ are respectively spectra of the broadband source measured on spectrometer N at the corresponding output of the three-by-three optical splitter, $S_{Retrieved}$ is a retrieved signal spectra computed using all N spectral measurements associated with the broadband source that is injected into the first input of the three-by-three optical splitter, and $R_{Retrieved}$ is a retrieved reference signal spectra computed using all N spectral measurements associated with the broadband source that is injected into the second input of the three-by-three optical splitter.

19. The device of claim 18, wherein the retrieved signal spectra and the retrieved reference spectra are computed by setting all $A_{RN}$ and $A_{SN}$ to one.

20. The device of claim 12, wherein for a reference optical signal that originates from a stable optical source, the instructions upon execution by the processor cause the processor to use a measured spectra of the reference optical signal to determine spectra and a phase value of the input optical signal at a plurality of wavelengths.

* * * * *